United States Patent
Boyd

(10) Patent No.: US 7,899,006 B2
(45) Date of Patent: Mar. 1, 2011

(54) LOCATION SYSTEM FOR WIRELESS LOCAL AREA NETWORK (WLAN) USING RSSI AND TIME DIFFERENCE OF ARRIVAL (TDOA) PROCESSING

(75) Inventor: Robert W. Boyd, Eidson, TN (US)

(73) Assignee: Zebra Enterprise Solutions Corp., Oakland, CA (US)

(*) Notice: Subject to any disclaimer, the term of this patent is extended or adjusted under 35 U.S.C. 154(b) by 725 days.

(21) Appl. No.: 11/949,080

(22) Filed: Dec. 3, 2007

(65) Prior Publication Data

US 2008/0130604 A1    Jun. 5, 2008

Related U.S. Application Data

(60) Provisional application No. 60/868,552, filed on Dec. 5, 2006.

(51) Int. Cl.
*H04W 4/00*    (2009.01)
*H04W 24/00*    (2009.01)

(52) U.S. Cl. .................... 370/328; 455/456.1
(58) Field of Classification Search ............. None
See application file for complete search history.

(56) References Cited

U.S. PATENT DOCUMENTS

| | | | |
|---|---|---|---|
| 5,074,706 A | 12/1991 | Paulos | 404/12 |
| 5,604,715 A | 2/1997 | Aman et al. | 367/118 |
| 5,920,287 A | 7/1999 | Belcher et al. | 342/450 |
| 5,995,046 A | 11/1999 | Belcher et al. | 342/450 |
| 6,026,378 A | 2/2000 | Onozaki | 705/28 |
| 6,121,926 A | 9/2000 | Belcher et al. | 342/450 |
| 6,127,976 A | 10/2000 | Boyd et al. | 342/463 |
| 6,266,723 B1 | 7/2001 | Hash | 324/243 |
| 6,317,082 B1 | 11/2001 | Bacon et al. | 342/465 |
| 6,356,802 B1 | 3/2002 | Takehara et al. | 700/215 |
| 6,366,242 B1 | 4/2002 | Boyd et al. | 342/450 |

(Continued)

OTHER PUBLICATIONS

H. Reid, "*Product Overview; G2 Microsystems System-on-Chip, G2C501, a Wi-Fi, RFID Active Tag,*" Directions Magazine (Online), May 1, 2006, 4 pages, www.directionsmag.com/article.php?article_id=2151&trv=1.

(Continued)

*Primary Examiner* — Hong Cho
*Assistant Examiner* — Eunsook Choi
(74) *Attorney, Agent, or Firm* — Alston & Bird LLP

(57) ABSTRACT

A wireless local area network includes a plurality of access point stations that receive and transmit communications signals within the wireless local area network. A first set of access point stations are WiFi compliant and measure signal strength and determine the received signal strength indication (RSSI). A second set of access point stations are operable in accordance with the time of arrival (TOA) real time location standard (RTLS). A dual mode mobile station is operative for multimode communication with both the WiFi and RTLS compliant access point stations. A location processor is operatively connected with each of the access point stations and processes the RSSI and creates a RSSI locate map and processes communication signals from the second set of access point stations and determines which signals are first-to-arrive signals to locate the mobile station and update the RSSI locate map and locate any non-dual mode WiFi devices.

24 Claims, 12 Drawing Sheets

U.S. PATENT DOCUMENTS

| | | | |
|---|---|---|---|
| 6,380,894 B1 | 4/2002 | Boyd et al. | 342/450 |
| 6,433,750 B1 | 8/2002 | Sugita | 343/713 |
| 6,434,194 B1 | 8/2002 | Eisenberg et al. | 375/238 |
| 6,476,719 B2 | 11/2002 | Belcher et al. | 340/572.1 |
| 6,502,005 B1 | 12/2002 | Wrubel et al. | 700/116 |
| 6,577,246 B1 | 6/2003 | Handa et al. | 340/901 |
| 6,577,921 B1 | 6/2003 | Carson | 700/214 |
| 6,593,885 B2 | 7/2003 | Wisherd et al. | 342/463 |
| 6,655,582 B2 | 12/2003 | Wohl et al. | 235/380 |
| 6,657,586 B2 | 12/2003 | Turner | 342/357.07 |
| 6,665,585 B2 | 12/2003 | Kawase | 700/226 |
| 6,700,533 B1 * | 3/2004 | Werb et al. | 342/357.48 |
| 6,728,629 B2 | 4/2004 | Oka et al. | 701/200 |
| 6,774,817 B2 | 8/2004 | Tanji et al. | 340/933 |
| 6,812,839 B1 | 11/2004 | Belcher et al. | 340/572.1 |
| 6,853,687 B2 | 2/2005 | Harrington et al. | 375/259 |
| 6,859,485 B2 | 2/2005 | Belcher | 375/130 |
| 6,892,054 B2 | 5/2005 | Belcher et al. | 455/63.1 |
| 6,987,744 B2 * | 1/2006 | Harrington et al. | 370/328 |
| 2002/0070891 A1 | 6/2002 | Huston et al. | 342/357.09 |
| 2002/0080759 A1 | 6/2002 | Harrington et al. | 370/338 |
| 2002/0094012 A1 | 7/2002 | Belcher | 375/130 |
| 2002/0104879 A1 | 8/2002 | Wohl et al. | 235/380 |
| 2002/0135479 A1 | 9/2002 | Belcher et al. | 340/572.1 |
| 2002/0175855 A1 | 11/2002 | Richton et al. | 342/357.02 |
| 2002/0181565 A1 | 12/2002 | Boyd et al. | 375/152 |
| 2003/0137968 A1 | 7/2003 | Lareau et al. | 370/349 |
| 2003/0191555 A1 | 10/2003 | Takehara et al. | 700/215 |
| 2004/0022214 A1 | 2/2004 | Goren et al. | 370/332 |
| 2004/0102870 A1 | 5/2004 | Andersen et al. | 700/215 |
| 2004/0249557 A1 | 12/2004 | Harrington et al. | 701/115 |
| 2005/0107953 A1 * | 5/2005 | Sugla | 701/300 |
| 2005/0136972 A1 * | 6/2005 | Smith et al. | 455/554.1 |
| 2005/0201301 A1 * | 9/2005 | Bridgelall | 370/254 |
| 2005/0280578 A1 * | 12/2005 | Boyd | 342/465 |
| 2006/0075131 A1 * | 4/2006 | Douglas et al. | 709/230 |
| 2006/0220851 A1 | 10/2006 | Wisherd | 340/568.1 |
| 2007/0123215 A1 * | 5/2007 | Wang et al. | 455/411 |
| 2007/0176749 A1 | 8/2007 | Boyd | 340/10.1 |
| 2007/0182556 A1 | 8/2007 | Rado | 340/572.1 |
| 2007/0223996 A1 | 9/2007 | Green et al. | 404/9 |
| 2007/0252728 A1 | 11/2007 | Wisherd et al. | 340/933 |
| 2007/0280182 A1 * | 12/2007 | Wisherd et al. | 370/338 |
| 2008/0014960 A1 * | 1/2008 | Chou | 455/456.1 |
| 2008/0039115 A1 * | 2/2008 | Haugli et al. | 455/456.1 |
| 2008/0129545 A1 * | 6/2008 | Johnson et al. | 340/933 |
| 2008/0272185 A1 * | 11/2008 | Vesuna | 235/375 |

OTHER PUBLICATIONS

Molisch et al., "*MIMO Systems With Antenna Selection—An Overview*," Mar. 2004, pp. 1-18.

"*Position Tracking Interface Unit (PTIU) for RTG's*," Paceco Corp., www.pacecocorp.com, pp. 1-6.

Jorichs, Von Hartmut, "*Neue Systeme zur Steuerung von Flurforderzeugen*," Technische Rundschau, Jan. 6, 1989, pp. 34-39.

"Wherenet Introduces Wireless Locations Solution for Marine Terminals," Online, Oct. 21, 2003, www.wherenet.com/pressreleases/pr_10212003.html, 2 pages.

"Dockside Cranes Get Brains," RFID Journal, Online, Oct. 29, 2003, www.rfidjournal.com/articleview/630/1/17, 2 pages.

"WhereLan," Online, 2003, www.wherenet.com/pdfs/wherelan%204.9.04.pdf, 1 page.

"WhereTag III," Online, 2003, www.wherenet.com/pdfs/wheretag%20III.5.3.0.pdf, 1 page.

"WherePort III," Online, 2003, www.wherenet.com/pdfs/whereport.10.1.0.pdf, 2 pages.

* cited by examiner

US 7,899,006 B2

LOCATION SYSTEM FOR WIRELESS LOCAL AREA NETWORK (WLAN) USING RSSI AND TIME DIFFERENCE OF ARRIVAL (TDOA) PROCESSING

RELATED APPLICATION

This application is based upon prior filed copending provisional application Ser. No. 60/868,552 filed Dec. 5, 2006, the disclosure which is hereby incorporated by reference in its entirety.

FIELD OF THE INVENTION

This invention relates to the field of wireless local area networks (WLAN), and more particularly, this invention relates to wireless local area networks and a location system for locating mobile stations within a monitored environment using RSSI (Receive Signal Strength Indication) and ISO 24730 such as time-of-arrival processing.

BACKGROUND OF THE INVENTION

Wireless local area networks are becoming more commonplace as the use of portable computers, such as "laptop," "notebook," and "pen" computers become increasingly common in office environments and other locations. In most conventional wireless local area networks, a number of access point base stations form a cellular network for communicating with wireless mobile stations or other mobile devices. Each access point base station is typically connected to a network server, such as part of an ethernet or other network infrastructure. Any messages transmitted as wireless communication signals are first transmitted to an access point base station instead of transmitted along wireless stations. This type of centralized wireless communication using cells provides control over communications along existing wireless mobile devices. Typically, the wireless communication signals are a spread spectrum communications signal, for example, a direct sequence spread spectrum signal or a frequency hopping spread spectrum signal.

Although wireless local area networks are becoming more commonplace in offices and similar environments, most wireless local area networks do not provide the capability of determining the location of a wireless mobile device or other signal source operating in the wireless LAN environment. Although some wireless LAN systems provide for signal strength analysis of spread spectrum signals to determine location, none of them provide an accurate means of determining the location of a mobile device operative within the wireless infrastructure defined by access point base stations.

Various types of wireless local area network systems that use location systems of the assignee are disclosed in commonly assigned U.S. Patent Publication No. 2002/0080759 and U.S. Pat. Nos. 6,892,054 and 6,987,744, the disclosures which are hereby incorporated by reference in their entirety. Much of the disclosure in these incorporated by reference patents and published patent application rely on differential time-of-arrival (TOA) applications that receive a transmitted signal at multiple physical locations corresponding to a receiver to locate a tag transmitter. The clocks could be synchronized so that differences in the indicated time-of-arrival closely approximate the actual time-of-arrival difference. Commonly assigned U.S. Patent Publication No. 2007/0176749 filed Jan. 30, 2007 by the same inventor, and the disclosure which is hereby incorporated by reference in its entirety, discloses a location system used in a wireless local area network that determines differences in signal arrival times, for example, when receivers are unsynchronized.

Time-of-arrival measurements made with respect to independent (randomly related) clocks contained in non-synchronized receivers can be accurately related to each other if the receivers observe signals from sources at known locations. A WLAN signal source can be placed in a known fixed location that propagates directly to all participating receivers. Each receiver can measure the time-of-arrival for transmissions from the reference source and communicate them to a central clock tracking service, which could be hardware or software implemented. Knowing how much time is required for the reference source's signal to propagate to each receiver, the tracking service can evaluate what time each receiver clock indicated when the source transmitted. By observing reference signals sufficiently often, the tracking service can determine a continuous relationship between the independent clocks. This relationship can then be used to accurately relate time-of-arrival measurements for signals arriving from unknown locations.

Some locations systems support the 802.11 WiFi system that use the Receive Signal Strength Indication (RSSI) of transmitted signals from mobile stations. These WiFi networks use access points that are generally less expensive than knitting active RTLS systems together. WiFi access points operate in conjunction with WiFi based tags. Typically, location systems will use either one of the WiFi access points for RSSI processing or a WLAN time differential of arrival (TDOA) processing with various access points and tag transmitters that conform with the ISO 24730 real-time location system (RTLS) standards. There are some tag transceivers that use a dual mode of operation in which the tag transceiver can operate in one of a selected WiFi configuration for RSSI processing or the ISO 24730 mode for time differential of arrival processing. The RSSI processing system uses a locate map, but it would be advantageous to update the locate map with the accuracy of different location points such as applied from the WELAN time of arrival processing to allow non-dual mode mobile stations can be located.

SUMMARY OF THE INVENTION

A wireless local area network includes a plurality of access point stations that receive and transmit communications signals within the wireless local area network. A first set of access point stations comprise WiFi compliant access point stations that measure signal strength and determine the received signal strength indication (RSSI). A second set of access point stations is operable in accordance with the time of arrival (TOA) real time location system (RTLS) standard. A dual mode mobile station is operative for multimode communication with both the WiFi and RTLS compliant access point stations. A location processor is operatively connected with each of the access point stations and processes the RSSI and creates a RSSI locate map while also processing communications signals from the second set of access point stations to determine which signals are first-to-arrive signals, locate the mobile station, and update the RSSI locate map and locate any non-dual mode WiFi devices.

In one aspect the dual mode mobile station is formed as a tag transceiver. A dual mode mobile station and WiFi compliant access point station can be operative with the IEEE 802.11 standard. The dual mode mobile station and WiFi compliant access point stations can be operative in a CCX mode for 802.11 tag transceivers.

In another aspect the location processor is operative for processing the maximum likelihood estimation for determining location probabilities and updating the RTLS locate map. The location processor is also operative for correlating signals as a first-to-arrive signals and conducting differentiation of the first-to-arrive signals to locate the dual mode mobile station.

In another aspect, the access point stations are positioned at known locations within the wireless local area network and operative for transmitting spread spectrum communications signals. The location processor can comprise a matched filter correlator.

In another aspect the dual mode mobile station includes a receiver operative for receiving an interrogation signal and in response, transmitting an RF communications signal to the access point station. This receiver can be formed as a magnetic receiver.

BRIEF DESCRIPTION OF THE DRAWINGS

Other objects, features and advantages of the present invention will become apparent from the detailed description of the invention, which follows when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It should be understood that the ISO/IEC 24730 standard defines two air interface protocols. It can include a single application program interface (API) for real-time locating systems (RTLS) used in asset management. The API is a boundary across which application software facilitates programming languages to invoke services. These could be procedures or operations, including shared data objects and resolution of identifiers. The information flow across the API boundary is defined by the semantics and syntax of the programming language.

Figure 1:
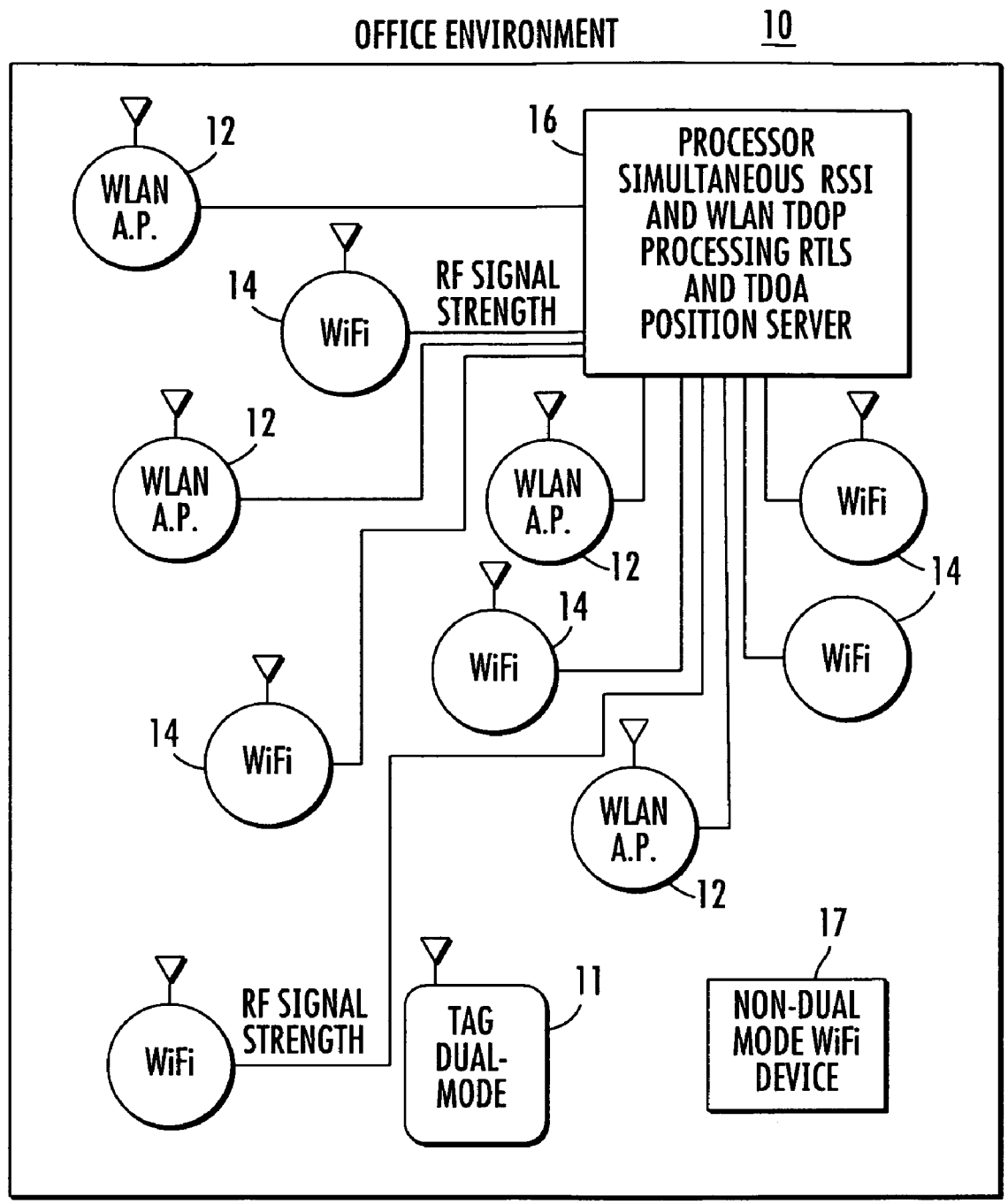
FIG. 1 a block diagram of a location system in an office environment as a non-limiting example and showing WLAN access points and WiFi access points that work in conjunction with a processor for simultaneous RSSI and WLAN time differential of arrival processing.

FIG. 1 shows a location system, such as in an office environment 10, which uses a dual mode tag transceiver 11 that is operable not only with WLAN access points 12 that operate in conformity with the ISO 24370 standard, but also WiFi access points 14 operable as 802.11 WiFi access points. The tag transceiver can transmit ID and telemetry reports to the WiFi access points that measure the signal strength or receive signal strength indication (RSSI) of the WiFi signal and forward this data to a location processor operative as a location engine 16 to calculate the tag position based on RSSI data. The position data is available to a tracking application. The tag transceiver is also operable with the WLAN access points using the time of arrival and preferably time differential of arrival algorithm. A tag transceiver can "blink" or transmit a direct sequence spread spectrum (DSSS) modulated 2.4 GHz signal that could be a 60 MHz bandwidth. The tag transceivers can be programmed using a magnetic data link and 2.4 GHz OOK/FSK modulation scheme for command acknowledgment. The processor 16 is operable for simultaneous RSSI and WLAN time differential of arrival processing. Thus, the processor acts as an RTLS and TDOA position server. A non-dual node device 17 can be operable using WiFi.

Figure 2:
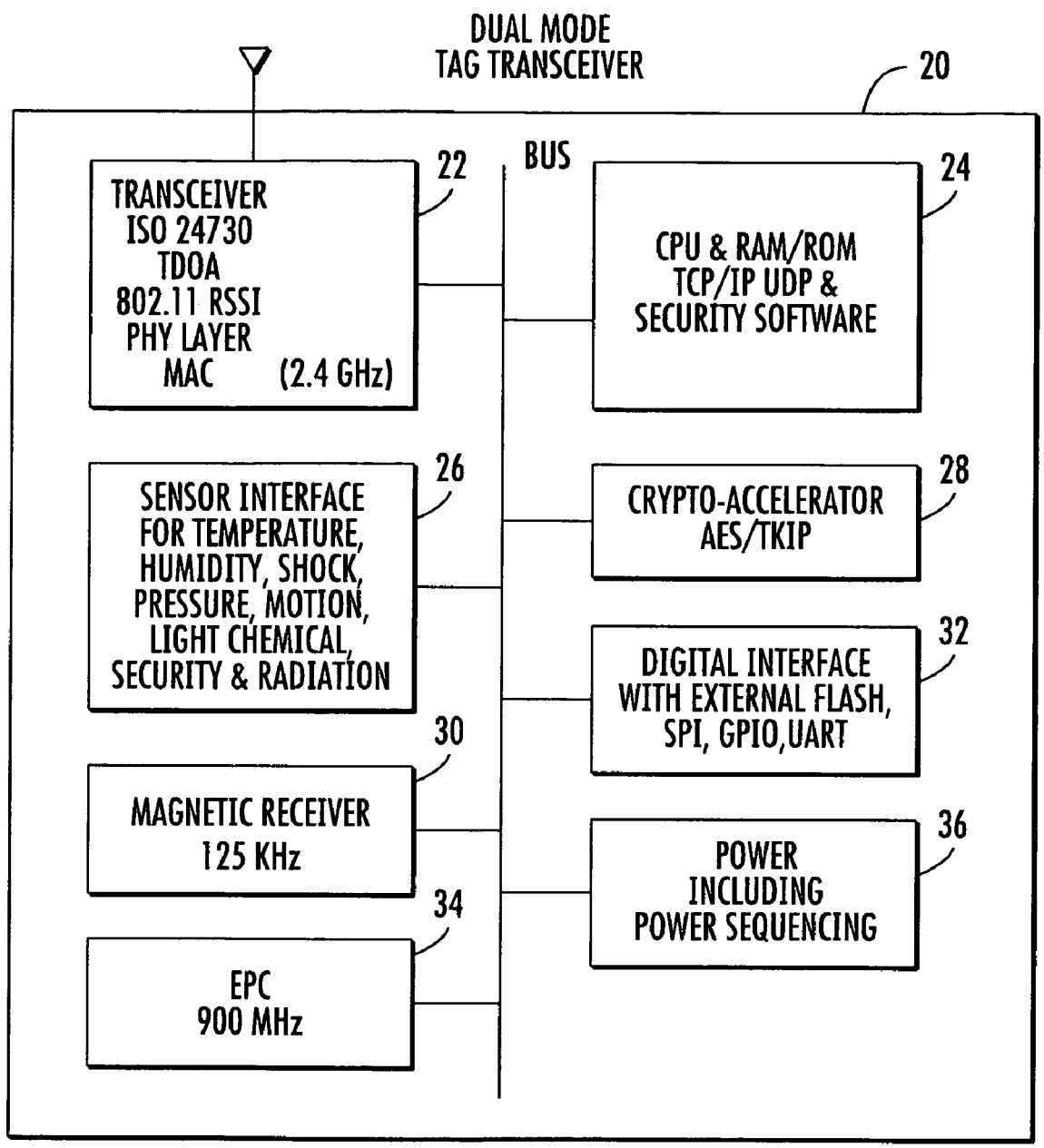
FIG. 2 is a block diagram of an example of a tag transceiver as a dual mode mobile station that can be used in accordance with a non-limiting example of the present invention.

FIG. 2 is a block diagram of a tag transceiver 20 operable as a mobile station that includes a chip set that could be used as the dual mode tag transceiver in accordance with a non-limiting example of the present invention. The chip set can be monolithically formed and include a transceiver 22 that is operable in accordance with the ISO 24730 TDOA and 802.11 RSSI. The transceiver can include the physical layer and media access control layer and operate at 2.4 GHz as explained above. The transceiver connects to a communications bus and connects to the central processing unit that has appropriate RAM and ROM with TCP/IP, UDP and security software. A sensor interface 26 is operable to interface with the temperature, humidity, shock, pressure, motion, light, chemical, security and radiation applications and demands. A crypto-accelerator 28 is operable with AES/TKIP for temporal key integrity protocol. A magnetic receiver 30 is operative at about 125 KHz. A digital interface 32 is operable as external flash, serial peripheral interface (SPI), general purpose input/output (GPIO), and universal asynchronous receiver/transmitter (UART). The electronic product code (EPC) circuit 34 is operable at 900 MHz as known to those skilled in the art. A power module 36 can include power sequencing.

Client applications can interface with the RTLS by virtue of the API that describes the RTLS service. The chipset that can be used in such a system is manufactured by G2 Microsystems Inc., under the designation G2 C501 as described relative to FIG. 2. That type of chip has a high level of integration and includes a low power transceiver operative at 2.4 GHz and operative with the 802.11 and ISO 24730. It is operative with the PHY and MAC layers as described before.

An AES and TKIP accelerator 28 could be a crypto accelerator. A 32-byte CPU 24 could include 64K RAM and 380K ROM as non-limiting examples and operate with TCP/IP, UDP and security software. The digital interface could be used with external flash, SPI, GPIO or UART. The power management unit 36 could support a real-time clock and timer wake-up and power sequencing. The 802.11 portion could use the MAC address with 802.11 RSSI location. Also, it is operative with ISO 24730 TDOA readers. It is operative as a system-on-chip (SOC) tag transceiver with full functionality. It can support the Electronic Product Code (EPC) numbering scheme and thus allow tracking within three meters as part of the ISO 24730. The sensor interface can gather data on the surrounding environment.

It should be understood that the location system as described relative to FIGS. 1 and 2 can use a maximum likelihood estimator in which a probability function is created. The device could give a measurement error to follow the distribution as a time measurement as one distribution but as a signal strength measurement, it could have a different distribution. Thus, it could be one more input to a maximum likelihood equation with a different error distribution of how the propagation path is different from the $R^2$ loss of free-space type of air.

The maximum likelihood estimation picks values of model parameters that make the data "more likely" than other values of parameters would make them for a fixed set of data and underlying probability model. Maximum likelihood estimation (MLE) typically requires no minimal distributional assumptions. With a given set of parameter values based upon the RSSI and parameter values, a corresponding probability density function (PDF) will show that some data are more probable than other data and the RSSI map can be updated. When the data have been collected and the likelihood function of a model given the data has been determined, the statistical inferences about the population can be made as a probability distribution. Thus, the desired probability distribution is the one that makes the observed data "most likely." The system also seeks the value of the parameter vector that maximizes the likelihood function. A resulting parameter vector can be solved by searching the multi-dimensional parameter space as the MLE estimate. This is the population that is most likely to have generated the observed data and thus seeks the probability distribution that makes the observed data most likely.

An overlay of WN ISO 24730 is used with the WLAN RSSI (Receive Signal Strength Indication) locates to improve the performance of the RSSI system. RSSI locates use a point-by-point map of the RF signal strength reported by several, arrayed Access Points (AP) to locate WiFi enabled-tag assets and clients. Current systems require a very tedious manual calibration of a facility upon initial installation and periodic ongoing to calibration account for changes in the RF environment, such as new metallic materials storage areas, WIP movement, etc.

The dual-mode (WiFi and 24730) tag transceiver as a mobile station, such as shown in FIG. 2, can be located by an array of location sensors as access points in a coverage area. This same area is simultaneously covered by a WiFi RSSI location system. Thus, the random movement of dual-mode tagged assets having tag transmitters (transceivers as mobile stations) in the area can by used to create and continuously update the RSSI Locate Map with the accuracy of the ISO 24730 locates. This RSSI map can then be applied to locate all non-dual mode, WiFi only devices, such as laptops and PDA's.

The location sensor can be a locating access point such as manufactured by WhereNet Corporation of Santa Clara, Calif., and operable with the real time locating system and also operable as 802.11(b) WiFi compliant communications.

This system offers several advantages:

1) Elimination of manual point-by-point RSSI mapping;
2) Continuous RSSI accuracy updates to constantly changing RF environments; and
3) Better overall RSSI locate system accuracy from the increased quantity of map data points created by the dual-mode asset tags randomly moving around the coverage area during their normal flow.

It should be understood that RSSI is a measurement of the received radio signal. It is used as part of the IEEE 802.11 protocol family. RSSI is often done at the IF stage of a radio circuit or at baseband. RSSI output is often at a DC analog level. The RSSI can be sampled by an internal ADC and the codes are available directly or via peripheral or internal processor bus.

The tag transceiver is operative with the Cisco Compatible extensions (CCX) that are compatible with 802.11 standards and WPE data encryption with full WiFi compliance. It should be understood that Kalman filtering can possibly be used.

The tag transceiver can be a Wheretag IV as manufactured by Wherenet Corporation of Santa Clara Calif., with the attributes indicated below.

Performance:
ISO 24730—2 Mode:
Frequency Range—2.4 to 2.483 GHZ
Typical Locate Range, Indoors—100 m (325 ft)
Typical Locate Range, Outdoors—1000 m (3275 ft)
Typical Read Range, Indoors—200 m (650 ft)
Typical Read Range, Outdoors—1750 m (5725 ft)
User Configurable Blink Rate—1 sec to 5 days
Typical Battery Life—7 years
Environmental/Physical/Power
Size—43.7 mm×66.0 mm×21.3 mm (1.72"×2.60"×0.84")
Weight—51 g (1.8 oz)
Operating Temperature—−30° C. to +85° C. (−22° F. to +185° F.)
Storage Temperature—−40° C. to +85° C. (−40° F. to +185° F.)
Environmental Sealing—IP67 (Dust tight, Immersible)
Durability—1.8 m (6 ft) Drop to concrete
Antenna—Integral Omni-directional
Battery—AA Lithium Thionyl Chloride cell (not replaceable)
Output Power—Configurable
IEEE 802.11b CCX Mode
Typical Locate Range, Indoors—21 m (70 ft)
Typical Read Range, Indoors—54 m (180 ft)
User Configurable Blink Rate—1 sec to 5 days
Typical Battery Life—5 years A system is now described that can be modified for use with the present invention. In the described system, signal sources, including wireless local area network (WLAN) clients, operate through the use of time-of-arrival (TOA) or differential TOA techniques. The signals are typically received at multiple (usually 3 or more) geographically separated points to support location of the source. Each receiver (e.g., WLAN access point) assesses the signal's TOA at its position, which supports subsequent source location via multilateration (e.g., trilateration).

The TOA measurements typically are accurate to within a time that supports the desired location accuracy. For locations to be accurate within a few feet, the TOA measurements typically should be accurate to within a very few nanoseconds. The system and method permits TOA measurements made at independent receivers to be related with accuracy sufficient to support location of the signals source without requiring unusually precise receiver clocks (oscillators), synchronization of those clocks or broadcast of the receiver's clock count.

The TOA measurements can be made with respect to independent (randomly related) clocks contained in non-synchronized receivers and can be accurately related to each other if the receivers observe signals from sources at known locations.

In one non-limiting example, a WLAN signal source is placed in a known fixed location that propagates directly to all participating receivers. Each receiver measures the TOA for transmissions from this reference source and communicates them to a central clock tracking service (hardware or software). Knowing how much time was required for the reference source's signal to propagate to each receiver, the tracking service can evaluate what time each receiver clock indicated when the source transmitted. By observing reference signals sufficiently often, the tracking service can determine a continuous relationship between the independent clocks. This relationship can then be used to accurately relate TOA measurements for signals arriving from unknown locations.

Multiple reference tags could be used. In practice, it is often not possible to find a location for a single reference source that propagates reliably and directly to all receivers used for location. In this case, it is possible to use multiple reference sources at known locations. Receivers are considered to be directly connected if they reliably and directly receive signals from the same reference source. The clock tracking service will be able to accurately relate all TOA measurements if each pair of location receivers are connected to each other. Pairs are connected if it is possible to get from one to the other by following any number of direct connections.

Non-WLAN reference tags could be used. Clock tracking reference signals can be any signal that supports accurate assessment of its TOA at the location receivers. There is no requirement for the signal to be a WLAN signal. For example, reference tags could send a T371 compatible signal to be used for clock tracking.

Embedded or bidirectional reference tags could also be used. A particularly useful situation is when the reference signal is generated at instants that are known relative to one of the clocks that is tracked. One example has the reference signal generated by a transmitter embedded in the receiving equipment (e.g., a WLAN beacon). A closed loop exists between any pair of receivers that contain embedded reference tags. Having a closed loop allows direct measurement of propagation delay and does not rely on assumptions of reference tag position and direct propagation. In some instances, however, WLAN equipment cannot determine the transmission time of its own beacon signal. As a result, some new capability may be required to support this closed loop clock tracking feature.

It is possible to use small pulses for the wireless LAN signal. It is not always necessary to know processing and propagation delays. It should be understood that wireless LAN signals are used and no other signals are necessary. If the system determines that the bidirectional propagation is the same in either direction, it is not necessary to know about delays.

Figure 3:
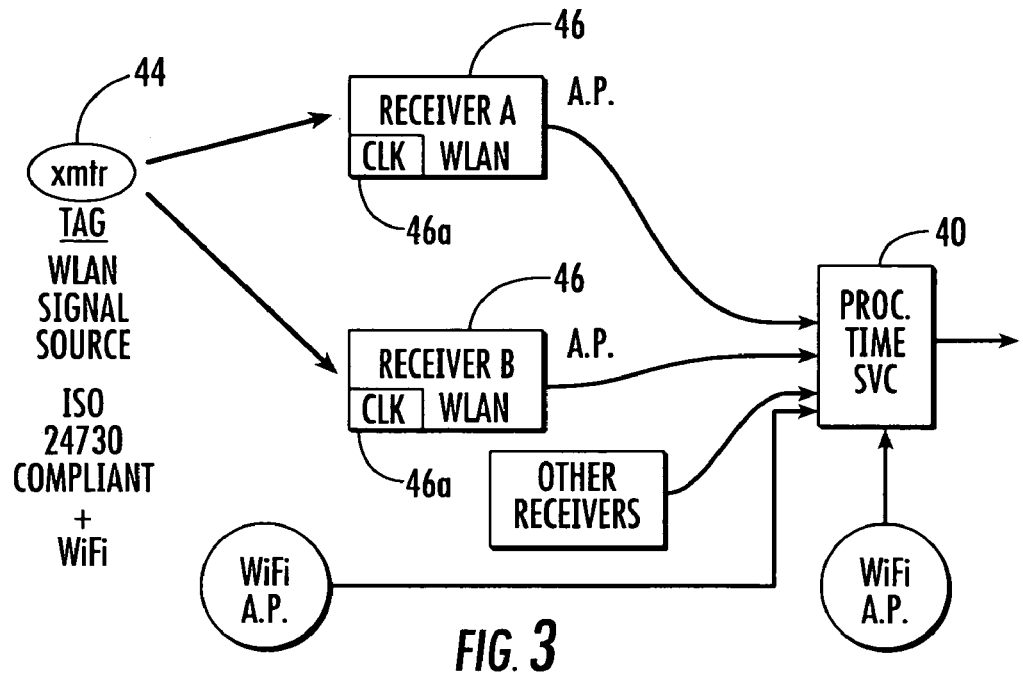
FIG. 3 is a block diagram showing an example of components that could be used with a location system and showing unsynchronized receivers that receive an RF signal from a tag transmitter in a wireless local area network where information is forwarded to a processor operative as a time service.
Figure 4:
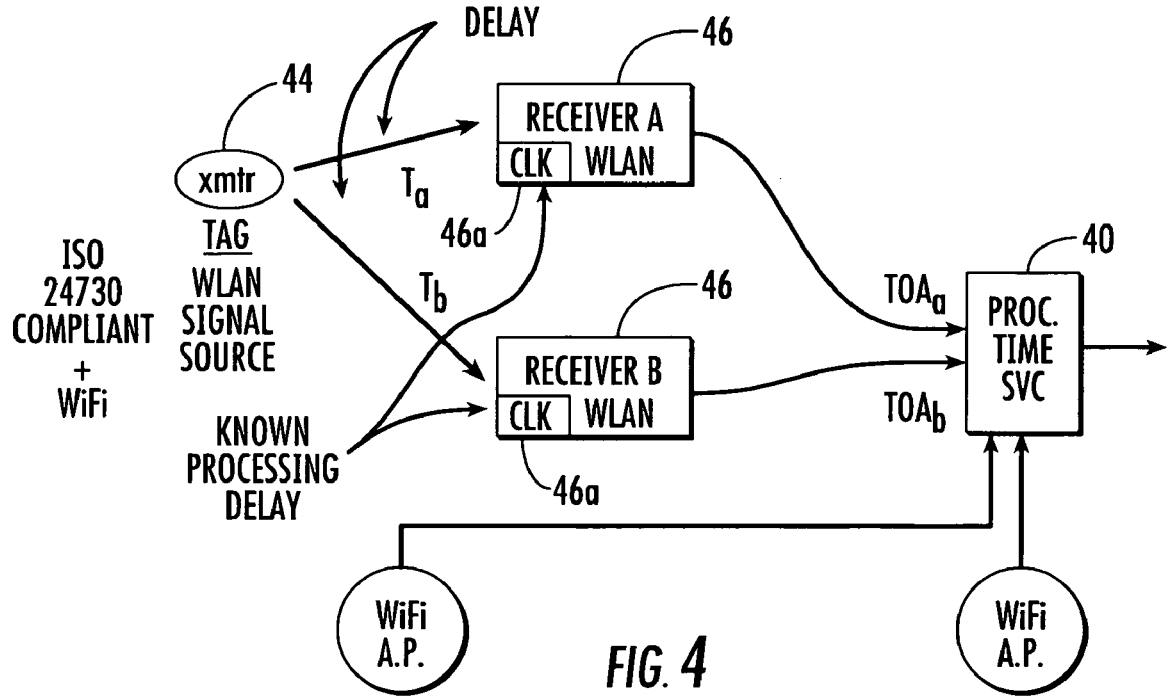
FIG. 4 is a block diagram similar to FIG. 1, but showing the time-of-arrival information that is forwarded to the processor as a time service, including the processing of known propagation and processing delays.
Figure 3A:
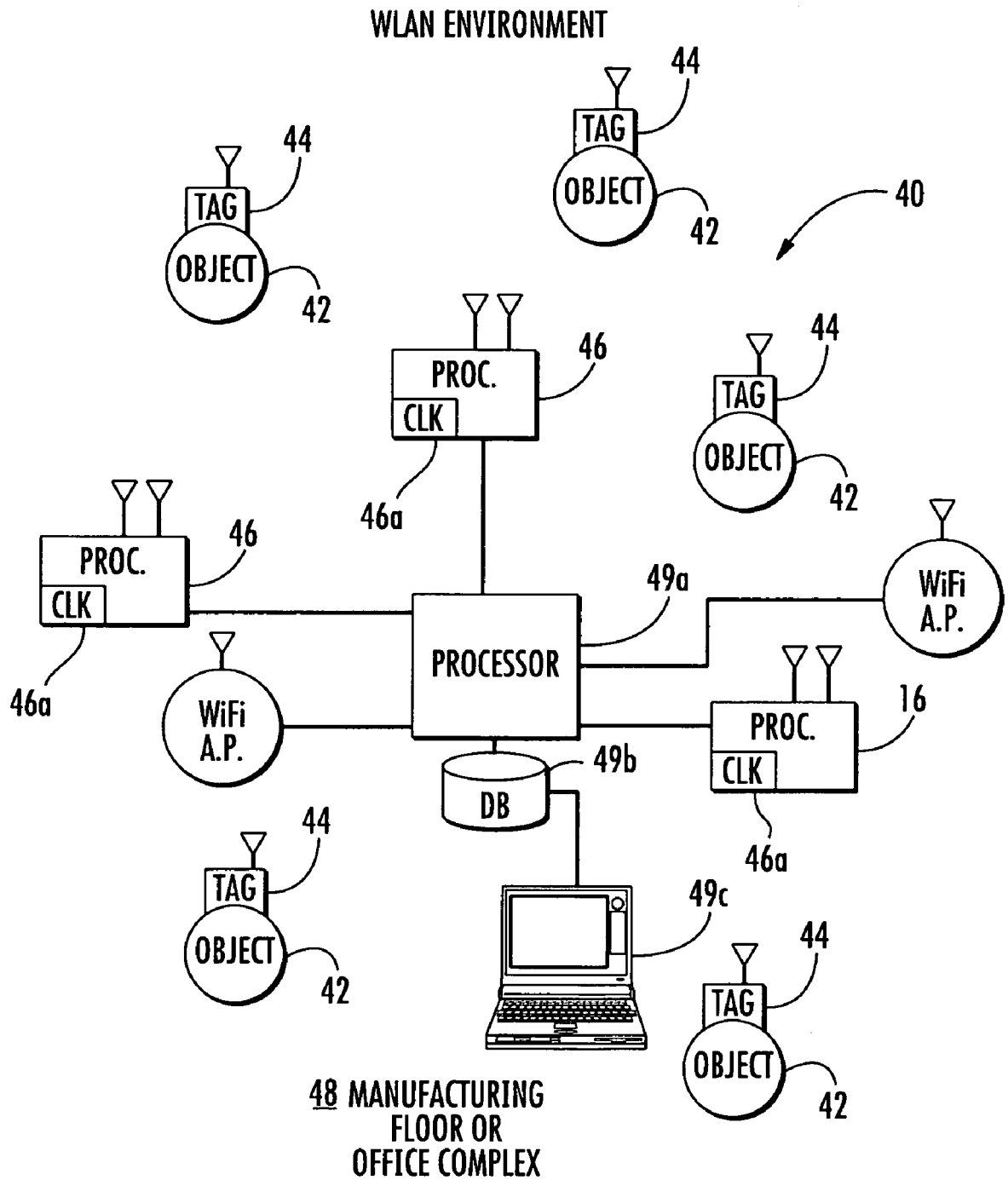
FIG. 3A is a block diagram showing an example of general architecture of a tagged object tracking and location system.

FIGS. 3, 3A and 4 set forth a location system and method that achieves time synchronized network performance using unsynchronized receiver clocks such as set forth in U.S. Published Patent Application No. 2005/0280578, the disclosure which is hereby incorporated by reference. This type of system can be modified for use with the present invention and is explained below.

For purposes of description, a location system that could be modified for use with the present invention is described with reference to FIG. 3A. As shown in the non-limiting example of FIG. 3A, a location system 40 includes a number of objects 42 having wireless tag transmitters 44 associated therewith. A number of signal readers 46 as receivers are contained within the monitored environment 47, for example, a manufacturing floor, and act as tag signal readers (receivers) for receiving signals from the wireless tag transmitters 44. Each signal reader 46 of a receiver includes a receiver clock 46a, which can be unsynchronized in some cases. This system could be part of a wireless local area network.

The tag signal readers 46 could be associated with an access point base station of a wireless local area network transmission operable in both WiFi and WLAN as described. Separate WiFi access points can be included. The signals transmitted by the wireless tag transmitters 44 are wideband, spread spectrum signals and, in one aspect, a timing marker could be appended a predetermined time in front of the wideband, spread spectrum signal for indicating the presence of the wideband, spread spectrum signal. A location processor 49a, which could be operative as the time service, is operatively coupled to the tag signal readers such as by a wireless communication system or a wired connection, for detecting the timing markers of signals. Whether a timing marker is used or not, the processor correlates a signal as a first-to-arrive signal and conducts differentiation of first-to-arrive signals to locate a wireless transmitter. If a timing marker is used, it could be timed about 80 to about 120 nanoseconds in front of the wideband, spread spectrum signal.

Much of the technology and detection capability as described can use circuitry and algorithms described in the commonly assigned and incorporated by reference patents and published patent applications listed above. The circuitry described in these references can be modified for use with system and method for achieving time synchronized network performance even when receiver clocks are unsynchronized.

A database 49b could be accessible by a personal computer 49c or other workstation, and be used for providing data updates, control over the system or viewing the operation of the system, For example, the computer workstation tool could be used as disclosed in commonly assigned U.S. Pat. No. 6,366,242. This 242 patent is hereby incorporated by reference in its entirety.

Although operation of tag transmitters can vary depending on the type of circuitry chosen by those skilled in the art, a tag transmitter transmits wideband (spread spectrum) pulses of radio frequency energy that are encoded with information, such as that representative of the identification of the object, and other object-associated information stored in a memory. A timing marker could precede the pulse as a preamble.

Each tag transmitter 44 can have a unique internal identification number that is transmitted via radio frequency and could also be read with a bar code scanner, if necessary. This could allow seamless integration of a bar code system with a location system. The tag transmitter could include a memory having a read/write memory that acts as a portable data file to carry data between various environments and provide a field accessible, distributed database. The frequency range can vary, but as one non-limiting example, it could be about 2.4 to about 2.483 GHz. The typical read range can range from about 350 feet to greater than 1,000 feet in some instances, and even greater depending on the type of system and transmitter.

The tag signal readers or receivers 46 can be operative as network nodes, and include an active receiver and antenna array in some examples that capture spread spectrum radio signals from the tag transmitters. They are typically installed in a grid pattern to provide complete coverage to a site. They can be mounted from as little as 250 feet apart to as much as 750 feet apart and even greater distances.

Although mutually diverse antenna are illustrated, it is also possible that an omni-directional, circularly polarized antenna could be used as noted in some of the aforementioned and incorporated by reference patents and published patent applications. This would allow a tag signal reader to receive signals from any direction and provide hemispherical coverage within an environment to maximize response to the horizon and diminish response by several decibels to signals arriving from a vertical (downward) direction, which could be advantageous in some cases. The use of mutually diverse antennas, on the other hand, obviates some multipath based fades and nulls. It is also possible to incorporate configuration and/or sensitivity diversity into the antennas, such as by using orthogonally polarized antennas.

It is possible that the relationship between unsynchronized receivers 46 can be determined by having the receivers observe the same radio frequency (RF) signal. There may be nothing special about this RF signal, or it could include a unique characteristic, for example, sent from a known location. In either case, the receivers 46 would not have to perform special processing for this RF signal.

Each receiver 46 determines the signal's time of reception noting its own clock 46a and sends its clock information to the central processor 49a, which is also operative as a "time service" of the invention. These signals can be sent by any convenient means, i.e., over a wired or wireless Local Area Network (LAN).

In this example, clocks 46a in each receiver 16 are free running, i.e., completely unsynchronized. The processor 49a is operative as a time service and discovers relationships between these clocks 46a and adjusts indicated arrival times appropriately, creating the illusion of time-synchronized receivers 46. Using these common observations, the processor 49a learns how to relate the times indicated by each receiver clock to every other receiver's clock.

Consequently, rather than synchronizing each receiver 46, the processor adjusts the indicated TOA's to reflect what would have resulted if the clocks 16a had been synchronized. These adjustments are reevaluated as often as necessary to preserve the required accuracy of the time relationships.

FIG. 4 is another view similar to FIG. 3, but showing the implementation of this technique with details as to what parameters could be used. The tag transmitter 44, which could be a WLAN signal source in this non-limiting example, is permanently placed in a known location, thus becoming a reference signal. Both receivers 46 time-stamp the received signal with respect to their unsynchronized local clock.

If the difference in propagation and/or processing delays are known, as illustrated, the processor operative as a time service can use the two time stamps to determine a pair of clock indications, for example, a clock A value and a clock B value corresponding to the same time. Additionally, two time-separated transmissions allow determination of differential clock rate and three transmissions indicate differential rate change. Consequently, the processor builds and maintains a model of the relationship between the two clocks.

The relationships between the receiver clocks 16a can be derived from common observations of an event, e.g., receptions of the same signal at multiple receivers. These events as signals may or may not be specially created for timing purposes.

Fundamental relationships for this description are:
$T_x$=time of signal transmission by reference (actual time; unknown);
$T_a$=propagation delay to +processing delay of receiver A (known);
$T_b$=propagation delay to +processing delay of receiver B (known);
$TOA_a$=time of arrival at receiver A (as indicated by clock A; measured);
$TOA_b$=time of arrival at receiver B (as indicated by clock B; measured), If propagation delay is small enough, which is often the case in some applications, it is known that at time $T_x$ the clock in receiver A indicates $(TOA_a-T_a)$ and the clock in receiver B indicates $(TOA_b-T_b)$.

Relating $T_x$ to actual time requires additional information. However, relative knowledge is sufficient for the processor as a time service to determine time-of-arrival differences for other signals, i.e., to be located, if the clocks count at the same rate. By observing a second reference transmission some time later, the processor as a time service can determine the difference in clock rates between both receivers A and B.

By making N transmissions spaced in time, the time server is able to determine an $(N-1)^{st}$ order polynomial relating the two independent clocks, By making the process continuous, every transmission after first N allows the processor as a time service to update its clock relationship equation. This continually tracks the changes in the clock relationships over time.

Repetitive receptions of a signal transmitted from a known location allow the processor to determine an equation relating one receiver's indicated time (clock) to another receiver's indicated time (clock) and track changes in that relationship over time.

In some cases, it is desirable that a reference tag transmitter be at a position where the propagation delay to multiple receivers is constant and known. Typically this means the tag transmitter is located at a known location and has direct line-of-sight propagation to the receivers.

Tag transmitters can be used, however, even if their location is unknown. Fixed location tags can be referred to as reference tags. One technique is to use a pair of tag transmitters with known differential propagation delay to multiple receivers. This still requires line-of-sight propagation to the receivers but removes the requirement of knowing their location. An additional benefit is that knowing the receiver processing delay is no longer required. Instead, the value can be essentially constant from receiver to receiver.

A particularly useful implementation is when the tag transmitters are co-located with the receivers. In this case, the only requirement is that propagation is reciprocal, that is, the propagation delay from the transmitter at receiver A to receiver B is the same as the propagation delay from the transmitter at receiver B to receiver A.

It is possible that the processor as a time service can operate with no fixed reference signals by exploiting over-determination. A general differential time-of-arrival (DTOA) location solution may require K observations to solve in K−1 physical dimensions. When more than K receivers detect the signal, the additional information can be used as if the transmitter were a reference signal. An over-determined location system can maintain the time service function without any signals generated specifically for system timing.

It is also possible to avoid quadratic computational complexity. For example, a system having M receivers usually maintains M*(M−1)/2 clock pair relationships, which rapidly becomes computationally prohibitive as system size grows. It is possible to avoid having the number of tracking loops, maintained by the processor as the time service, grow quadratically with the number of receivers in the system. This is accomplished by defining a system time.

Each clock can be tracked with respect to a system time. This results in a linear relationship between time service complexity and system size. System time has little meaning relative to measuring TOA differences, but has greater significance in making implementation of a time service feasible.

System time can be imaginary. It only needs to be close enough to actual time that the difference is indistinguishable over a typical signal propagation delay. One possibility is to define system time as the mean or median of all receivers' clocks. System time can also be significant because it can be made to correspond to some time standard. For example, system time can be defined to be whatever a particular receiver's clock indicates. Another example is to equate it to a local reference clock, perhaps internal to the time service's host. Alternatively, it may be tied to an external standard such as GPS. Relating receiver clocks to an arbitrary system time makes time service complexity grow only linearly with respect to system size.

Figure 5:
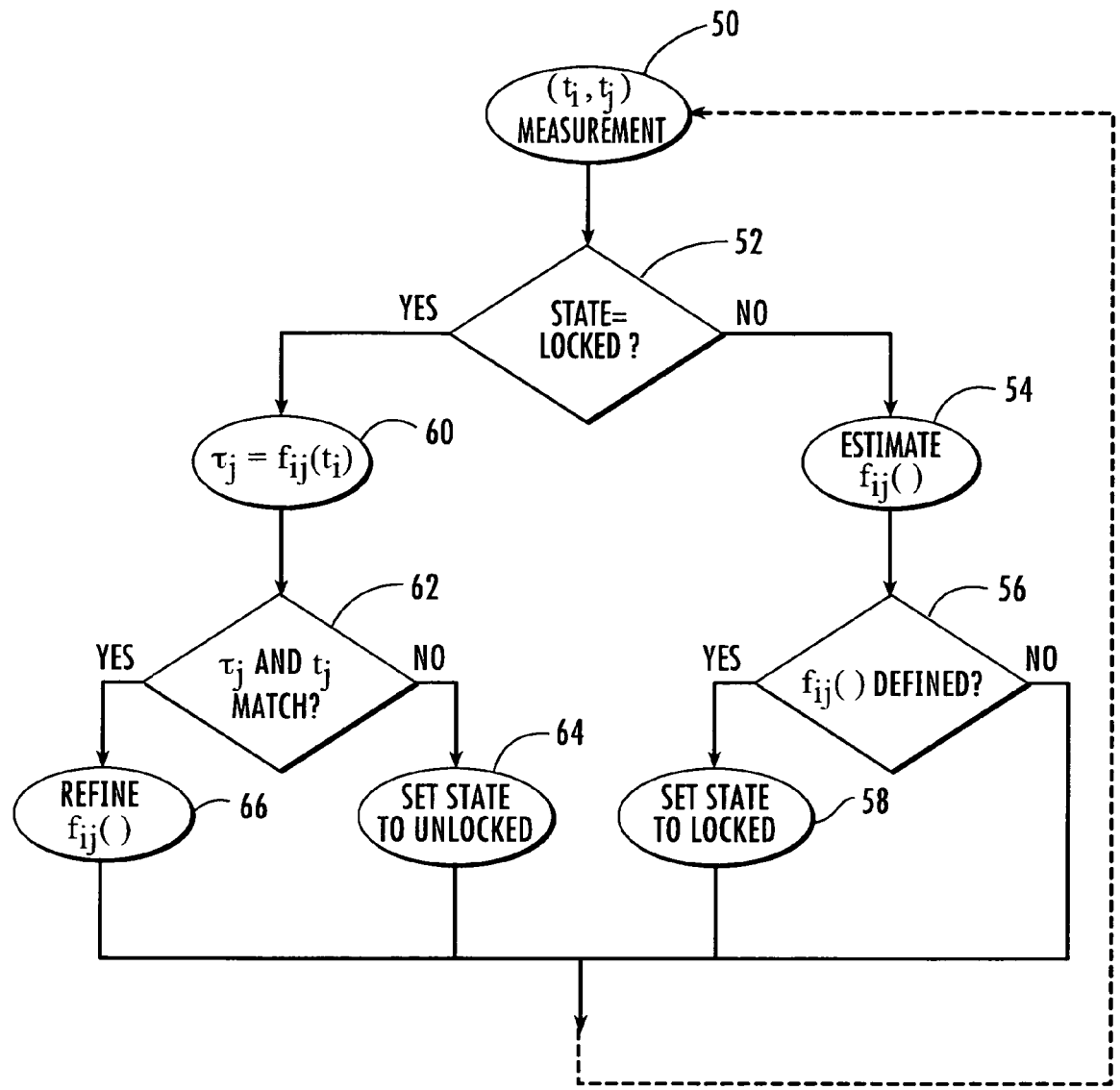
FIG. 5 is a high-level flow chart showing a clock tracking loop that can be used with the system as described.

The processor as time service creates and maintains a function that describes how the clocks in two independent units are related to each other. It is a straightforward extension to relate all clocks to each other and provide the relationship between clock pairs. This can be accomplished by a clock tracking loop, such as shown in FIG. 5.

The information provided as inputs to the loop are pairs of times $(t_i, t_j)$, which imply that when the $i^{th}$ clock indicated time $t_i$ the $j^{th}$ clock indicated time $t_j$. This information comes from measuring the time-of-arrival $(toa_k)$ of a signal (generated from a known location) at both sensor i and sensor j. In this example, since the location of a tag transmitter and both sensors are known, the time required for the signal to propagate to each sensor $(p_k)$ can be determined. Thus, at the time the signal was generated, the clock in sensor i indicated time $toa_i-p_i$ and the clock in sensor j indicated time $toa_j-p_j$, producing the desired $(t_i, t_j)$ pair as $(toa_i-p_i, toa_j-p_j)$.

There is a functional relationship. For example, it is possible to assume a cubic function as an example of a clock relationship, $f_{ij}(\ )$, that is:

$$f_{ij}(t)=c_3t^3+c_2t^2+c_1t+c_0.$$

The four equation coefficients, $c_k$, can be determined after four time pairs have been received. The tracking loop shown in FIG. 3 shows how these coefficients may be refined (updated) as the relationship between the individual clocks varies.

Every time a $(t_i, t_j)$ pair is measured the loop is iterated. The loop is considered to be locked if the relationship, $f_{ij}(\ )$, is defined. If not locked, the loop simply collects a number of measurements sufficient to determine the relationship. If locked, the expected value for $t_j$ (denoted as $\tau_j$ in FIG. 5) is computed. The tracking error $(t_j-\tau_j)$ is determined and compared to a threshold. If the error is overly great, the loop is considered to have become unlocked. Otherwise, the error is used to refine $f_{ij}(\ )$, that is, to track the changes in the clock relationship that occur naturally over time.

The flowchart of FIG. 5 illustrates this logic. Inputs $(t_i, t_j)$ (block 50) are input and a decision is made whether the state=locked (block 52). If not, the estimate $f_{ij}(\ )$ is made (block 54). A decision is made whether $f_{ij}(\ )$ is defined (block 56). If not, the loop returns. If yes, the state is set to lock (block 58) and the loop could then later repeat. If at block 52 the state is located, $T_j=f_{ij}(t_i)$ (block 60), a decision is made whether $\tau_j$ and $t_j$ match (block 62). If not, the state is set to an unlocked position (block 64). If yes, refine $f_{ij}(\ )$ (block 66).

It is also possible to achieve time synchronized network performance with receivers that are positioned such that some form a loosely connected network with tightly coupled receivers.

The WLAN system shown with respect to FIGS. 6-9 can be used and modified for use with the system and method of the present invention. Such system is described in detail in commonly assigned U.S. Pat. No. 6,892,054, the disclosure which is hereby incorporated by reference in its entirety.

Figure 8:
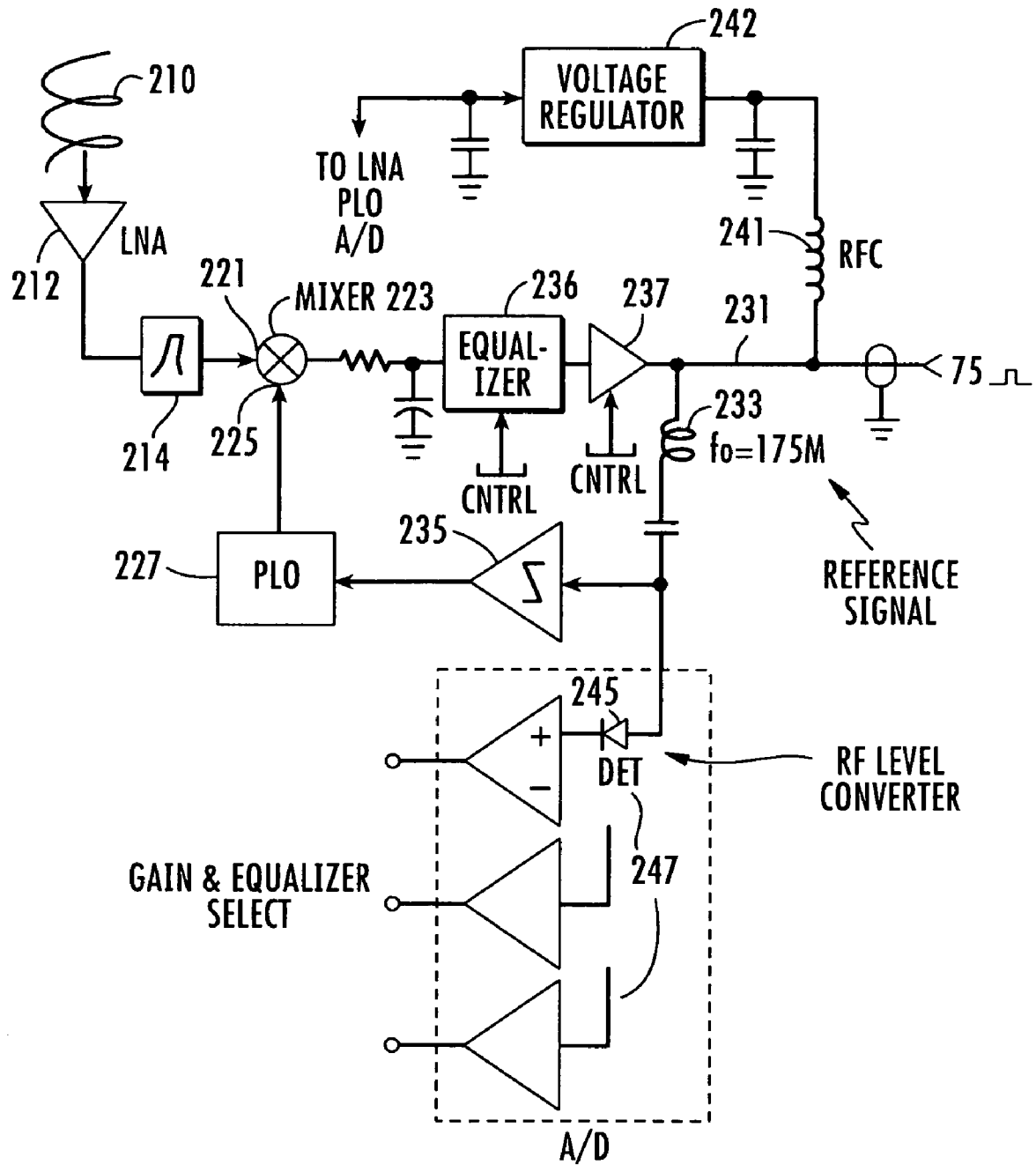
FIG. 8 is a high-level block diagram of an example of a circuit architecture that can be used as part of a processor for determining first-to-arrive signals.
Figure 9:
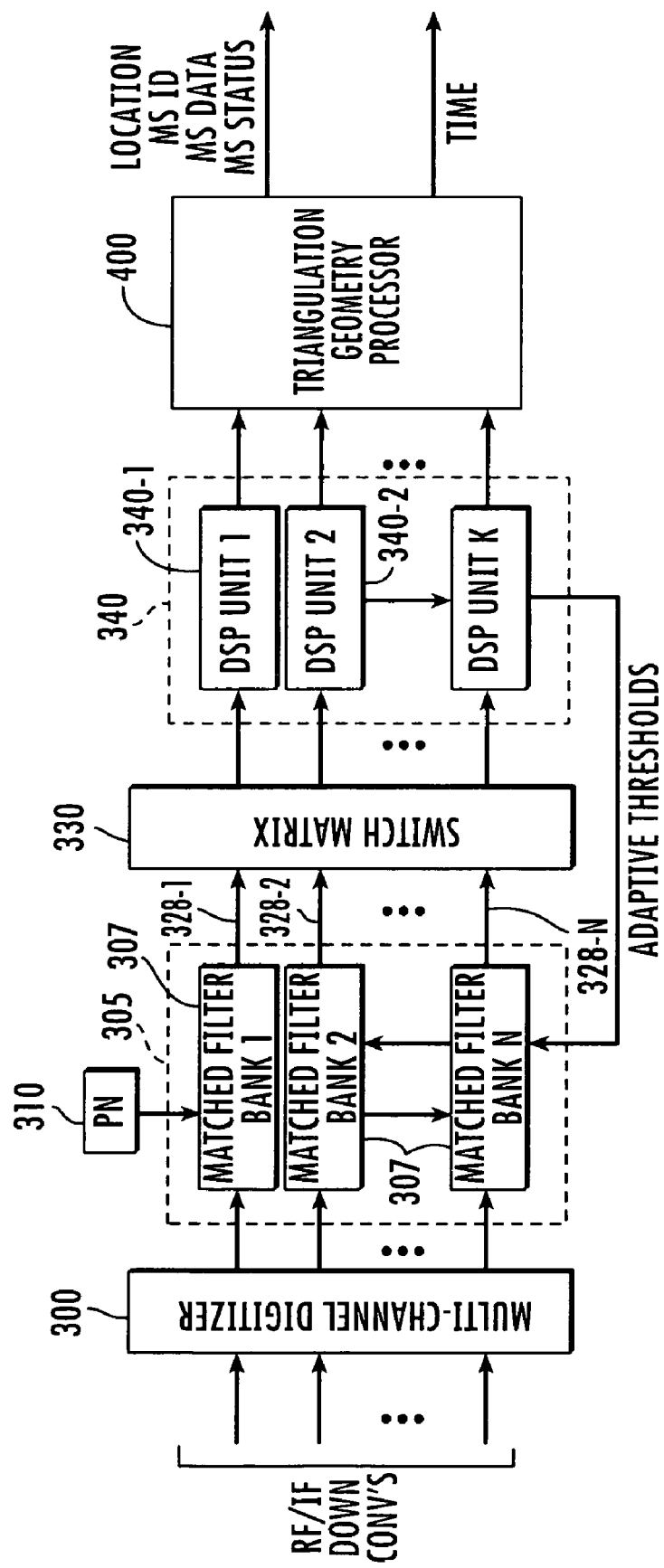
FIG. 9 is another high-level block diagram of an example of the circuit architecture that can be used with the present invention for correlation-based RF signal processors.

As will now be described in detail, relative to the overall system shown in FIGS. 6 and 7 and more detailed circuit structures shown in FIGS. 8 and 9. A location system as used with a wireless local area network and a tag location system (FIG. 7) is described. FIGS. 8 and 9 show representative circuits and algorithms as also disclosed in the incorporated by reference patents that can be used with the present invention. Further details of such circuits are found in one or more of commonly assigned U.S. Pat. Nos. 5,920,287; 5,995,046; 6,121,926; 6,127,976; 6,268,723; 6,317,082; 6,380,894; 6,434,194; 6,476,719; 6,502,005; 6,593,885; 6,853,687; 6,657,586; 6,812,839; and U.S. Published Patent Application Nos. 2002/0181565; 2002/0094012; 2002/0104879; 2002/0135479; and 2007/0252728, the disclosures which are hereby incorporated by reference in their entirety.

Figure 7:
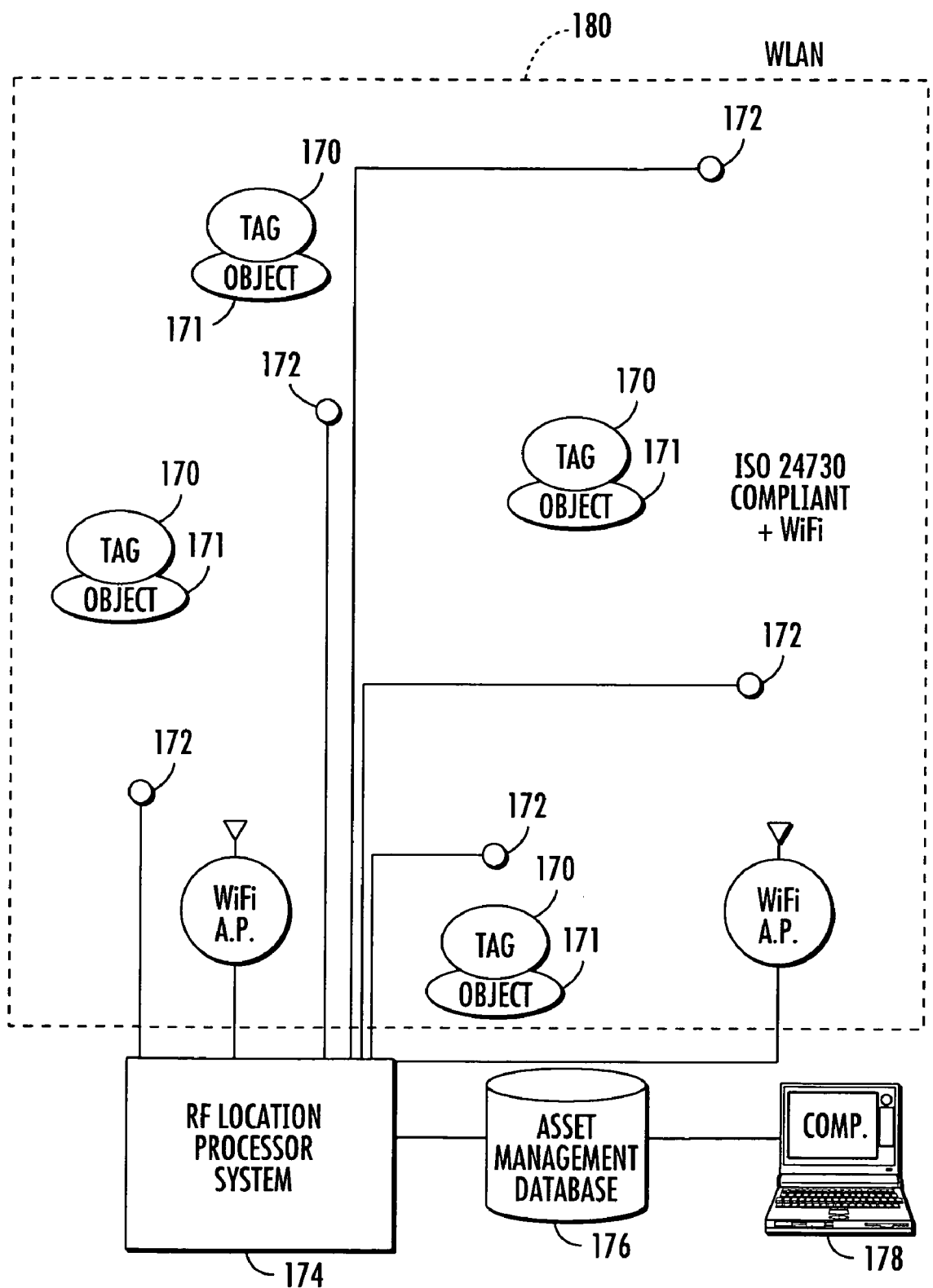
FIG. 7 is a system diagram showing a general architecture of a location system that could be used and modified for use with the present invention.

FIG. 7 illustrates a high-level block diagram of a WLAN system 120 and showing a network server 122 that is part of an Ethernet local area network 124. A plurality of access point base stations 126 each define a cell (shown as 127a, 126b, 127c) as part of a wireless local area network 130 that communicates with wireless mobile stations (MS) using wireless communication signals that, in a preferred embodiment, are spread spectrum wireless communication signals. A single mobile access point station 131 is illustrated, although a plurality of such stations could be used in the system. Reflecting surfaces 133 are illustrated and usually are an annoying determent to the system. Another antenna 133a is an interference source.

A processor 132 is operatively connected to each of the access point base stations (both fixed and wireless) and operative to process communication signals transmitted from a mobile station and determine which signals are first-to-arrive signals, typically based on a common timing signal. A location processor conducts differentiation of the first-to-arrive signals to locate the mobile station. A processor 132a is incorporated with each access point base station in one aspect, A common timing signal can be applied to each access point base station (and to processor 132 and/or 132a) and could be provided by a wireless timing signal broadcast to each of the access point base stations, such as by a mobile station (MS) located at a known location 134 or an access point base station that provides the common timing signal. In yet another aspect of the present invention, a common timing signal can be supplied through a common bus, such as part of the Ethernet structure.

Mobile and/or fixed access point base stations 126, 131 each have a wireless local area network (WLAN) receiver 136 for receiving communications signals. A separate location receiver 138 could be used for receiving separate location pulses. Processors 132 and/or 132a can determine which signals are first-to-arrive signals and conduct differentiation of the first-to-arrive signals to locate the mobile station. The receiver 136 can operate from the same antenna 140 or can operate in dual diversity using two antennae 140a, 140b, as shown with the mobile access point station 131.

Each access point station could also include a plurality of mutually diverse antennas used in locating a mobile access point station or mobile station. A communication signal could include a separate location packet or pulse. The location determination could occur by processing part of the normal data or by processing packets that are used specifically for locating the mobile access point station.

A communication signal transmitted from a mobile access point station 122 could include a spread spectrum location pulse appended to the wireless communication signal that could be of short duration, typically less than a one millisecond, spread spectrum transmission as a location pulse, which is distinct and different from the wireless local area network communication signal. This location pulse could be appended to the falling edge of the wireless communication signal or appended to the beginning or rising edge of the communication signal.

The mobile devices or stations in communication with a mobile access point station or mobile station could transmit location data as appended pulses as forth in commonly assigned U.S. Published Patent Application No. 2002/0080759, the disclosure which is hereby incorporated by reference in its entirety. A mobile access point station could also add any signaling and location information as determined by those skilled in the art. Although direct sequence spread spectrum communication signals are preferred, different spread spectrum signals could be used, including any type of location pulse, frequency hopping, chirp or other spread spectrum signal techniques. Location transmitters and location receivers with appropriate communication circuitry, as set forth in the incorporated by reference patents and copending patent application, can be included as part of any mobile station or access point station as determined by those skilled in the art. It is also possible to use a network management station (MMS) operative under simple network management protocol (SNMP) and operative with a management information base (MIB). The positive characteristics for objects corresponding to access point stations and other devices associated with a wireless local area network system could allow management control by a network management station.

FIG. 7 illustrates an environment where a plurality of tags 170 are associated with objects 171, such as items of inventory for manufactured objects in a factory corresponding to a monitored environment 180 as a non-limiting example. Of course, this system could be part of a wireless local area network. A plurality of spaced, monitoring receivers 172 receive signals from tag transmitters 170 and include processors (not shown in detail) for receiving the signals from the tag transmitters and determining which signals are first-to-arrive signals. These spaced monitoring receivers 172 are operative with an RF location processor system 174 to conduct differentiation of the first-to-arrive signals to locate an object and its associated tag 170. The processing system 174 is operative with an Asset Management Database 176 and computer 178 as described in the above-identified and incorporated by reference patents.

Referring now to FIGS. 8 and 9, a representative circuit and algorithm as described in the above mentioned and incorporated by reference patents are disclosed and set forth in the description below to aid in understanding the type of location system that can be used for determining which communication signals are first-to-arrive signals and how the processor conducts differentiation of the first-to-arrive signals to locate a mobile station, TAG, access unit or other device. This processor (or an associated processor) could also be operative for weighting the delayed versions of at least one interference signal by controlling amplitude and phase with weighted functions $W_1, W_2 \ldots W_n$ and summing weighted replicas to determine an approximation of the dispersed interference for cancelling interference.

FIG. 8 diagrammatically illustrates one type of circuitry configuration of a respective architecture for "reading" associated communication signals or a pulse (a "blink") used for location determination signals, such as signals emitted from a mobile station (M), a TAG, or a mobile access point station that is to be located. An antenna 210 senses appended transmission bursts or other signals from the mobile access point station to be located. The antenna in this aspect of the invention could also be omni-directional and circularly polarized and coupled to a power amplifier 212, whose output is filtered by a bandpass filter 214. Respective I and Q channels of the bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and applied to communication cable 231 through a communication signal processor, which could be an associated processor as described before. The communication cable 231 also supplies DC power for the various components of the location receiver by way of an RF choke 241 to a voltage regulator 242, which supplies the requisite DC voltage for powering an oscillator, power amplifier and analog-to-digital units of the receiver.

The amplitude of the (175 MHz) reference frequency supplied by the communications control processor to the phase locked local oscillator 227 implies the length of any communication cable 231 (if used) between a location processor and a receiver, such as if part of an access point station or other device. This magnitude information can be used as control inputs to equalizer 236 and current amplifier 237, so as to set gain and/or a desired value of equalization, that may be required to accommodate any length of a communication cable (if used). For this purpose, the magnitude of the reference frequency may be detected by a simple diode detector 245 and applied to respective inputs of a set of gain and equalization comparators shown at 247. The outputs of comparators are quantized to set the gain and/or equalization parameters.

Figure 6:
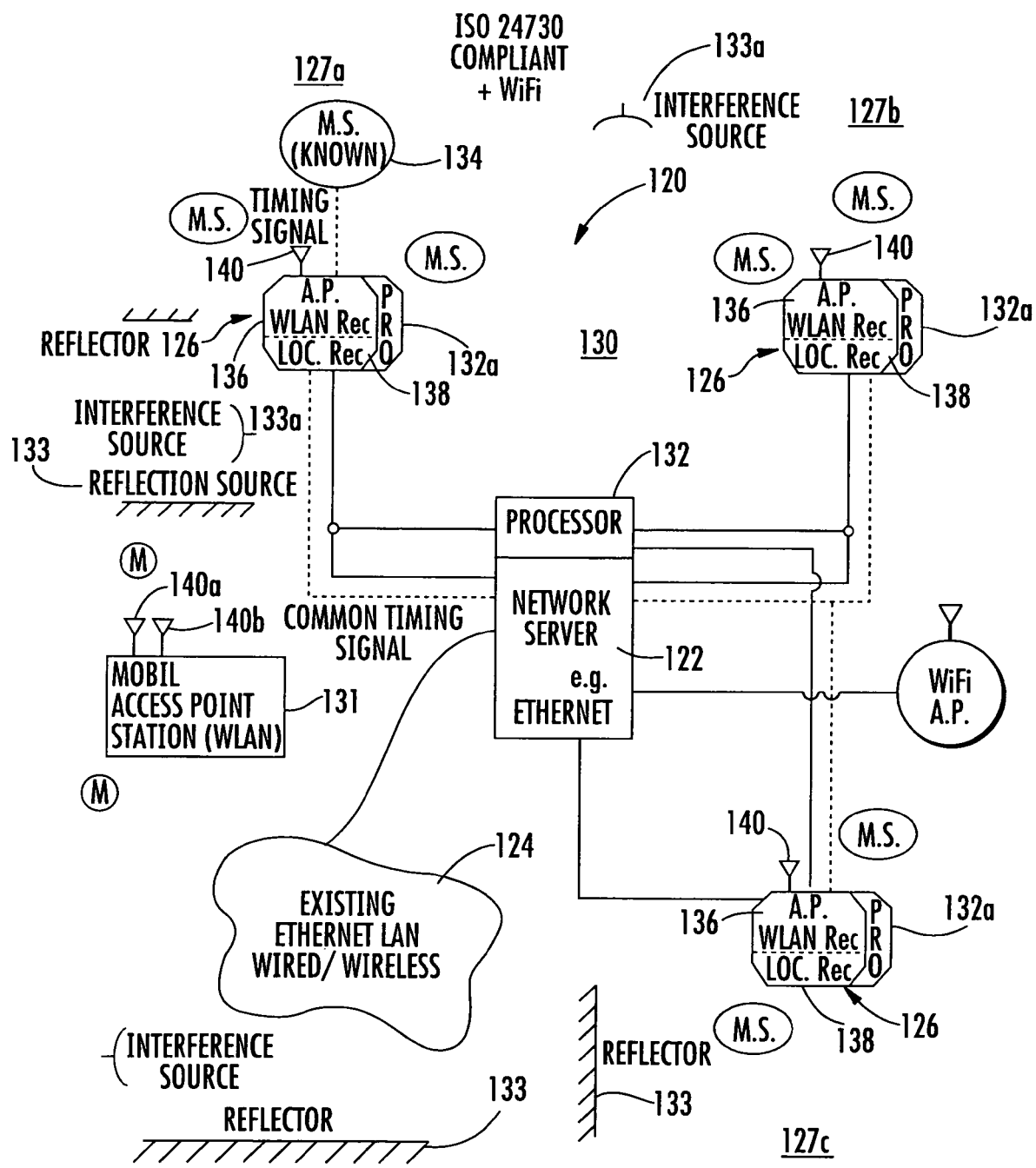
FIG. 6 is an overall system diagram of a wireless local area network using a location system that can be modified for use with the present invention.

FIG. 9 diagrammatically illustrates the architecture of a correlation-based, RF signal processor circuit as part of a processor to which the output of a respective RF/IF conversion circuit of FIG. 6 can be coupled for processing the output and determining location. The correlation-based RF signal processor correlates spread spectrum signals detected by an associated receiver with successively delayed or offset in time (by a fraction of a chip) spread spectrum reference signal patterns, and determines which spread spectrum signal received by a receiver of an access point station is the first-to-arrive corresponding to a location pulse or communications signal from the transmitter of a mobile access point station as part of the communications signal that has traveled over the closest observable path between a mobile access point station and the fixed location access point station or TAG and spaced monitoring receiver.

Because each receiver can be expected to receive multiple signals from the mobile access point station or other mobile device or TAG due to multipath effects caused by the signal transmitted by the mobile access point station or other device being reflected off various objects/surfaces between the mobile access point station and the receiver of other known access point stations 20, the correlation scheme ensures identification of the first observable transmission, which is the only signal containing valid timing information from which a true determination can be made of the distance from the station to the receiver.

For this purpose, as shown in FIG. 9, the RF processor employs a front end, multi-channel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive ADCs that are capable of directly sampling very high IF frequencies and large bandwidths, Implementing a bandpass filtering approach typically requires a second ASIC to provide an interface between the ADCs and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent. A PN spreading code generator could produce a PN spreading code (identical to that produced by the PN spreading sequence generator of the location transmitter). The PN spreading code produced by PN code generator is supplied to a first correlator unit and a series of delay units, outputs of which are coupled to respective ones of the remaining correlators. Each delay unit provides a delay equivalent to one-half a chip. Further details of the parallel correlation are found in the incorporated by reference '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of "on-demand" or "as needed" digital processing units 340-1, 340-2, ..., 340-K. One of the correlator outputs 328 has a summation value exceeding the threshold in which the delayed version of the PN spreading sequence is effectively aligned (to within half a chip time) with the incoming signal.

This signal is applied to a switching matrix 330, which is operative to couple a "snapshot" of the data on the selected-channel to a selected digital signal processing unit 340-$i$ of the set of digital signal processing units 340. The mobile access point station can "blink" or transmit location pulses randomly, and can be statistically quantified, and thus, the number of potential simultaneous signals over a processor revisit time could determine the number of such "on-demand" digital signal processors required. A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

Processor section 400 uses a standard multi-lateration algorithm that relies upon time-of-arrival inputs from at least three detectors of the access point stations or other devices to compute the location of the mobile access point station, or in other embodiments, locate a TAG or mobile station, such as a cellular phone, pager or other device. The algorithm may be one, which uses a weighted average of the received signals. In addition to using the first observable signals to determine object location, the processor also can read any data read out of a memory for the mobile access point station (or mobile device or other device if applicable) and superimposed on the transmission. Object position and parameter data can be downloaded to a database where object information is maintained. Any data stored in a mobile station memory may be augmented by altimetry data supplied from a relatively inexpensive, commercially available altimeter circuit.

It is also possible to use an enhanced circuit as shown in the incorporated by reference '926 patent to reduce multipath effects, by using dual antennae and providing spatial diversity-based mitigation of multipath signals. In such systems, the antennas of each location receiver at an access point station are spaced apart from one another by a distance that is sufficient to minimize destructive multipath interference at both antennas simultaneously, and also ensure that the antennas are close enough to one another so as to not significantly affect the calculation of the location of the object by the downstream multi-lateration processor.

The multi-lateration algorithm executed by the location processor can be modified to include a front end subroutine that selects the earlier-to-arrive outputs of each of the detector pairs as the value to be employed in the multi-lateration algorithm. A plurality of auxiliary "phased array" signal processing paths can be coupled to the antenna set (e.g., pair), in addition to the paths containing the directly connected receivers and their associated first arrival detectors that feed the triangulation locator processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively "early" signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the "pattern" or spatial distribution of gain to receive one incoming signal and ignore the other.

The multi-lateration algorithm executed by the location processor could include a front end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference '976 patent. This architecture can be configured to distribute the workload over a plurality of interconnected information handling and processing subsystems. Distributing the processing load enables fault tolerance through dynamic reallocation.

The front end processing subsystem can be partitioned into a plurality of detection processors, so that data processing operations are distributed among sets of detection processors. The partitioned detection processors are coupled in turn through distributed association processors to multiple location processors. For mobile access point station (or mobile device) detection capability, each receiver could also be equipped with a low cost omni-directional antenna, which provides hemispherical coverage within the monitored environment.

A detection processor filters received energy to determine the earliest time-of-arrival energy received for a transmission, and thereby minimize multi-path effects on the eventually determined location of a mobile device. The detection processor demodulates and time stamps all received energy that is correlated to known spreading codes of the transmission, so as to associate a received location pulse with only one mobile. It then assembles this information into a message packet and transmits the packet as a detection report over a communication framework to one of the partitioned set of association processors, and then de-allocates the detection report.

A detection processor to association control processor flow control mechanism equitably distributes the computational load among the available association processors, while assuring that all receptions of a single location pulse transmission, whether they come from one or multiple detection processors, are directed to the same association processor.

The flow control mechanism uses an information and processing load distribution algorithm to determine which of the association processors is to receive the message, and queues the message on a prescribed protocol coupling socket connecting the detection processor to the destination association processor. To select a destination association processor, the information and processing load distribution algorithm may include a prime number-based hashing operation to ensure a very uniform distribution of packets among association processors. In addition, to provide relatively even partitioning in the case of widely varying transmission rates, the hashing algorithm may use a sequence number contained in each transmission.

Each association processor can organize its received message packets by identification (ID) and time-of-arrival (TOA), and stores them as association reports. The association processor compresses the data within the association report, transmits that information over an association communication process of the communication framework to one of a plurality of distributed location processors, and then de-allocates the association report.

In order to deliver all association reports that have been generated for an individual mobile access point station (or other mobile or location device) to a single destination location processor, the association communication process of the communication framework may employ the same information and processing load distribution algorithm executed by the detection communication process of the communication framework. Each location processor determines the geographical location of a mobile access point station (or other mobile or location device) using the time-of-arrival measurement information originally sourced from the detection processors. The specific algorithm employed for location determination matches the number of arrival time measurements with whatever a priori information is available.

To locate a mobile access point station (or other mobile device or TAG), a processor may employ all available diversity information associated with the mobile of interest, including, but not limited to the station ID (if any), any data contained in the transmission and metrics indicating confidence it these values. It then forwards a location report containing this information over a location communication process to an asset management database. A location estimate may be derived from the measured time-of-arrival information in a received association report packet, using a differential time-of-arrival algorithm, such as a hyperbolic geometry-based function.

It is also possible to use a wireless local area network (WLAN) spread spectrum waveform to perform a geo-location function. The assumption is that the wireless communication signal, as a spread spectrum signal, has a high signal-to-noise ratio with reasonable power levels. The leading edge of this communication signal can be detected to a high accuracy and this information used with the algorithms as described before to provide relative time of arrival information for subsequent processing. It is possible to use edge detector circuitry as part of an access point station having a wireless local area network (WLAN) receiver. It is also possible to have a timing signal from a known location or unknown location. Other component locations could be known, of course. For example, some wireless local area network (WLAN) transmitters have known locations to enable the use of the algorithm when an access point station or other mobile station or device location is known.

It is also known that the communications signal as a spread spectrum communications signal can have sufficient bandwidth to provide useful time accuracy. For example, a 50 MHz bandwidth could provide approximately 5 nanoseconds of timing accuracy that is about 5 feet of accuracy using much of the technology and teachings described before. It is possible to use a correlator operative as a functional spread spectrum matched filter to enable a higher quality estimate with integration over many chips of the spread spectrum transmission. It is possible to use a matched filter that spans multiple symbols and improves accuracy by collecting more energy in the filter prior to leading edge detection.

The circuitry of a respective tag may be housed in a relatively compact, sealed transceiver module, which is sized to accommodate installation of a transceiver chip and one or more relatively long-life, flat-pack batteries and sensor devices. As a non-limiting example, the module may be rectangularly shaped, having a volume on the order of slightly more than one cubic inch, which allows the tag to be readily affixed to the temporary tag mounting device.

The general functional architecture of a tag can be formed as a transceiver (transmitter-transponder) unit, and used in the lane sensor system as described, and also used in any radio location and tracking system, which is either separate or a part of the lane sensor system. An example circuit is diagrammatically illustrated in FIG. 6A and the circuit components thereof are shown in detail in FIGS. 6B and 6C, such as disclosed in the incorporated by reference '687 patent.

Figure 10:
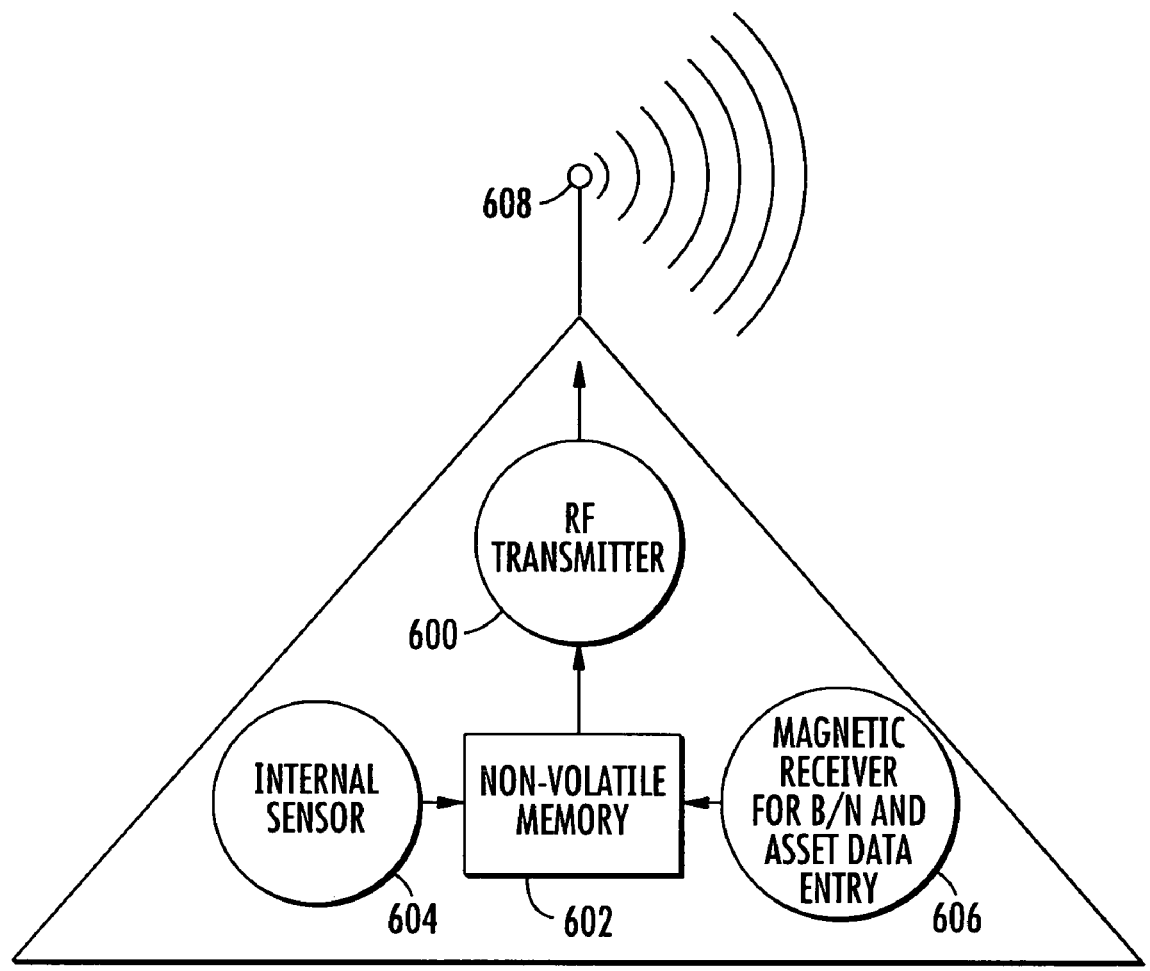
FIG. 10 is a general functional diagram of a tag transceiver that can be adapted for use in the system shown in FIGS. 1-9 in accordance with a non-limiting example of the present invention.

FIG. 10 is a general functional diagram of a tag transmitter as a tag transceiver that can be adapted for use in the system shown in FIGS. 1-9 as explained below. The tag transceiver (transmitter) includes an RF transmitter 600 that is operable with a non-volatile memory 602, internal sensor 604, and magnetic receiver as a short range magnetic receiver 606, which requires a very insubstantial amount of power compared to other components of the tag. Because the receiver-enabled pulse is very low power, it does not effectively effect the tag's battery life. As a relatively non-complex, low power device, the magnetic receiver is responsive to queries when the tag interrogator unit is relatively close to the tag (e.g., on the order of 10 to about 15 feet). This prevents an interrogator from stimulating responses from a large number of tags. Signal strength measurement circuitry within the tag interrogator or the tag may be used to provide an indication of the proximity of the query tag relative to the location of the interrogator, such as using RSSI circuitry within the interrogator and preferably within the tag as noted below. The tag includes an appropriate antenna 608.

Figure 11:
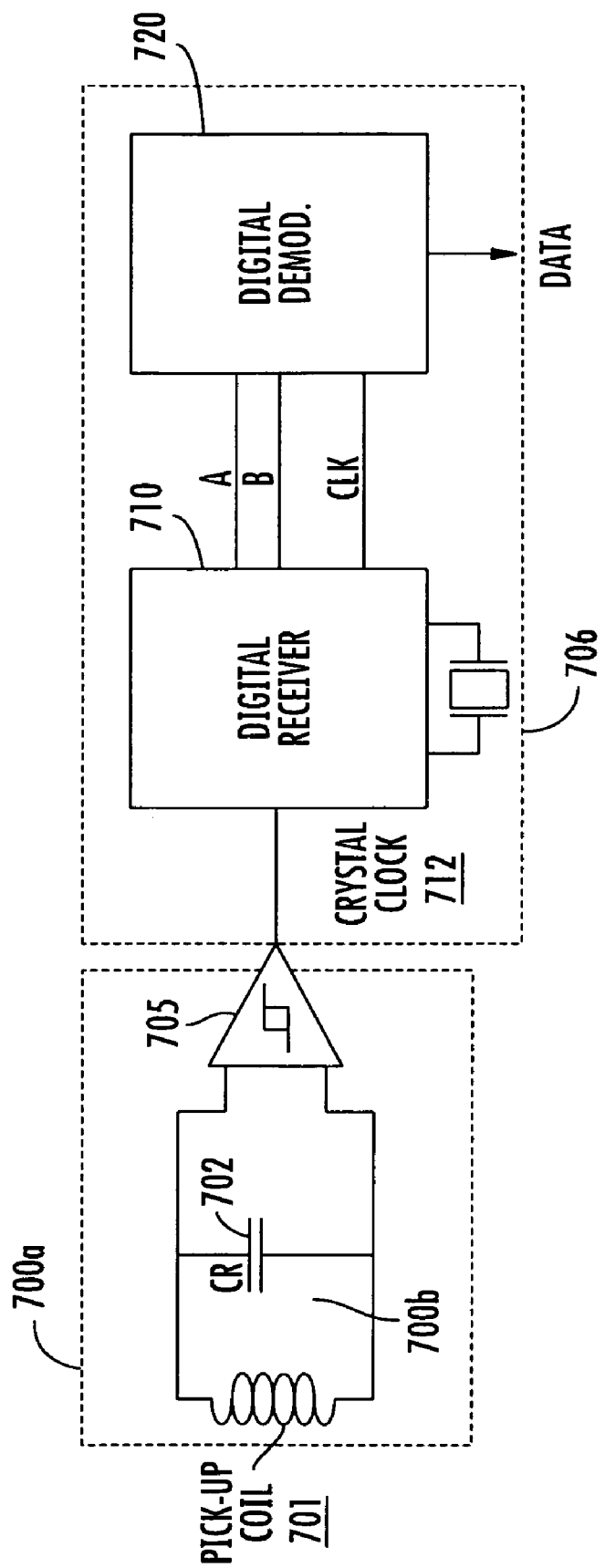
FIG. 11 is a circuit diagram showing a magnetic field receiver that can be used in accordance with a non-limiting example of the present invention.
Figure 12:
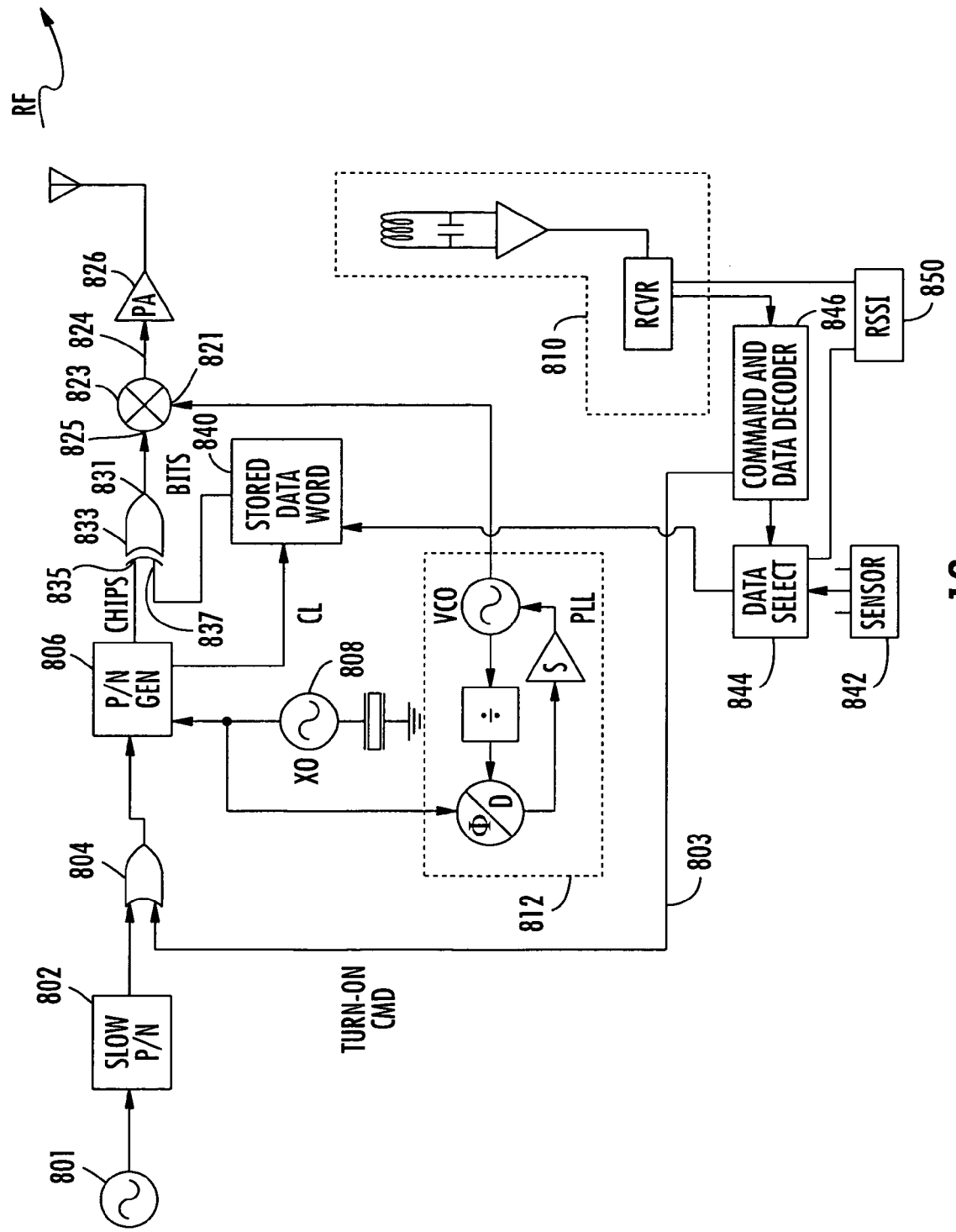
FIG. 12 is a schematic circuit diagram of an example of the circuit architecture of a tag transceiver that is modified to incorporate a magnetic field receiver.

FIGS. 11 and 12 show circuits for a tag transmitter as described and using reference numerals in the 700 and 800 series.

FIG. 11 diagrammatically illustrates the configuration of a magnetic field sensing unit 700a for a respective tag and comprising a resonant (LC tank) detector circuit 700b having a magnetic field-sensing coil 701 coupled in parallel with a capacitor 702. The parameters of the tank circuit components are such that the tank circuit 700b resonates at a frequency between the two FSK frequencies employed by a FSK-modulating magnetic field generator of the tag interrogator, For the non-limiting example of using frequencies of F1=114.7 kHz and F2=147.5 kHz, referenced above, the tank circuit 700b may have a resonant frequency of 131 kHz.

The resonant tank circuit 700b is coupled to a sense amplifier 705, which amplifies the voltage produced by the tank sensor circuit for the desired receiver sensitivity and buffers the detected voltage to the appropriate logic level for use by a digital receiver—demodulator 706. The digital receiver—demodulator 706 includes a digital receiver 710, that is referenced to a crystal clock 712. For the present example, the receiver clock is set to a frequency that corresponds to the difference between the FSK frequencies of the selected modulation pair F1/F2. Thus, for the current example of employing transmitter frequencies of 114.7 kHz and 147.5 kHz, the receiver clock may be set at 32.8 kHz. This reduced clock frequency serves maintains very low power consumption at low cost. The use of such a relatively low reference frequency in the receiver requires a slower data rate, since one clock cycle of the receiver clock represents only 3.4-3.8 FSK clock cycles.

As described in the incorporated by reference '719 patent, the digital receiver 712 may employ complementary buffer paths A/B that operate on alternate sample periods one-half the period of the received data spread code. This ensures that at least one of the two buffer paths will not be sampling data during transitions in the received FSK frequency. The receiver integration time is sufficiently long to count the number of rising edges in a received PSK signal, and readily differentiate between the two valid FSK frequencies (here, F1=114.7 kHz and F2=147.5 kHz), to determine when a frequency change occurs, and to reject other FSK signals and/or noise.

The digital demodulator 720 contains a state machine that demodulates the data by comparing a received sequence of FSK tones with a predefined start-of-message sequence (corresponding to a start synchronization code). As a non-limiting example, the start-of-message sequence may comprise a plurality of successive samples at one FSK frequency or tone (such as three symbol periods at the higher of the two FSK tones), followed by a plurality of successive samples at the second PSK frequency (e.g., three symbol periods at the lower of the two FSK tones). Upon detecting this sequence, the state machine initializes the data demodulation circuitry, so that the data may be clocked out as it is detected and demodulated.

As is customary in FSK-based modulation systems, data values of '1' and '0' are represented by respectively difference sequences of the two FSK tones. As a non-limiting example, a logical 'one' may correspond to one symbol period at the higher FSK tone (147.5 KhZ) followed by one spreading chip period at the lower FSK tone (114.7 kHz); a logical 'zero' may correspond to one symbol period at the lower FSK tone (114.7 kHz), followed by one symbol period at the higher FSK tone (147.5 Khz). Similar to detecting the start of a message, the demodulator's state machine may detect the end of a message by comparing a received sequence of FSK tones with a predefined end-of-message sequence. As a non-limiting example, the end-of-message sequence may be complementary to the start-of-message sequence, described above.

In an alternative embodiment the receiver may employ a phase detector a quadrature phase shift circuit resonant at the center of the two FSK tones. This alternative embodiment eliminates the requirement for a large spectral separation between the tones, so as to allow a narrower receiver bandwidth with better sensitivity and reduced susceptibility to interference. For example, the higher FSK tone may be reduced to 127 KHz, while still using the efficient 32.8 KHz system clock.

FIG. 12 shows the manner in which the circuit architecture of a tag transceiver (transmitter—transponder) unit employed in the radio location and tracking system of the type detailed in the above-referenced '719 patent (such as that shown in FIG. 4 of U.S. Pat. No. 5,920,287) may be modified to incorporate an encoded magnetic field receiver, such as that disclosed in the '719 patent and described above with reference to FIG. 12. As shown in FIG. 12, the augmented tag transceiver comprises an oscillator 801 the output of which is coupled to a variable pseudo random (PN) pulse generator 802.

The PN generator 802 is normally operative to generate series of relatively low repetition rate (for example, from tens of seconds to several hours), randomly occurring 'blink' pulses that are coupled through an OR gate 804 to a high speed PN spreading sequence generator 806. These blink pulses define when the tag randomly transmits or 'blinks' bursts of wideband (spread spectrum) RE energy to be detected by the tag transmission readers, in order to locate and identify the tag using time-of-arrival geometry processing of the identified first-to-arrive signals, as described above. The PN generator 802 is also coupled to receive a control signal on line 803 from magnetic field sensing circuitry of the type shown in FIG. 11, and depicted generally in broken lines 810.

In response to the tag's magnetic field sensing circuitry demodulating a blink rate reprogramming message, FSK-modulated onto the magnetic field generated by the magnetic field generator (pinger), it couples a blink rate change signal (e.g., changes the binary state of line 803 from its default, low blink rate representative level to a high blink rate logic level) to the variable PN generator 802. This increases the pulse rate at which 'blink' pulses are produced by generator and coupled through OR gate 804 to the high speed PN spreading sequence generator 806. As a consequence the tag blinks at an increased rate and thereby alert the tracking system of the proximity of the tagged object to an 'increased sensitivity' region where the magnetic field generator is installed.

In response to an enabling 'blink' pulse, the high speed PN spreading sequence generator 806 generates a prescribed spreading sequence of PN chips. The PN spreading sequence generator 806 is driven at the RF frequency output of a crystal oscillator 808. This crystal oscillator provides a reference frequency for a phase locked loop (PLL) 812, which establishes a prescribed output frequency (for example, a frequency of 2.4 GHz, to comply with FCC licensing rules). The RF output of PLL 812 is coupled to a first input 821 of a mixer 823, the output 424 of which is coupled to an RF power amplifier 826. Mixer 823 has a second input 825 coupled to the output 831 of a spreading sequence modulation exclusive-OR gate 833. A first input 835 of the exclusive-OR gate 831 is coupled to receive the PN spreading chip sequence generated by PN generator 806. A second input 837 of exclusive-OR gate 831 is coupled to receive the respective bits of data stored in a tag data storage memory 840, which are clocked out by the PN spreading sequence generator 806.

The tag memory 840 may comprise a relatively low power, electrically alterable CMOS memory circuit, which stores a multibit word or code representative of the identification of the tag. The tag memory 840 may also store additional parameter data, such as that provided by an associated sensor (e.g., a temperature sensor) 842 installed on or external to the tag, and coupled thereto by way of a data select logic circuit 844. The data select logic circuit 844 is further coupled to receive data transmitted to the tag by the FSK-modulated magnetic field generator, described above, and demodulated by the magnetic field sensing circuit 810. For this purpose the demodulated data is decoded by a command and data decoder 846. The data select logic circuit 844 may implemented in gate array logic and is operative to append any data it receives to that already stored in the tag memory 840. It may also selectively couple sensor data to memory, so that the tag will send only previously stored data. It may also selectively filter or modify data output by the command and data decoder 846.

When a magnetic field-modulated message from the magnetic field generator is detected by the receiver 810, the data in the decoded message is written into the tag memory 840, via the data select logic circuit 844. The command and data decoder 846 also couples a signal through OR gate 804 to the enable input of the PN generator 806, so that the tag's transmitter will immediately generate a response RF burst, in the same manner as it randomly and repeatedly 'blinks,' a PN spreading sequence transmission containing its identification code and any parameter data stored in memory 840, as described above. A RSSI circuit 850 is operative with the receiver as a magnetic field sensing circuit 810 to measure the received signal strength.

As will be appreciated from the foregoing description, the desire to communicate with or controllably modify the operation of a tag whose object comes within a prescribed region (e.g., passes through a passageway) of a monitored environment, is readily accomplished in accordance with the present invention, by placing an arrangement of one or more relatively short range, magnetic field proximity-based, tag-programming 'pingers' at a respective location of the monitored environment that is proximate to the region through which a tag may pass. The pinger may be readily implemented and the tag transceiver augmented in accordance with the respective magnetic field generator and tag-installed magnetic field sensor architectures described in the above referenced '719 patent.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A wireless local area network, comprising:
   a plurality of access point stations that receive and transmit communications signals within the wireless local area network, wherein a first set of said access point stations comprise WiFi compliant access point stations that measure signal strength and determine the received signal strength indication (RSSI) and a second set of said access point stations are operable in accordance with a time of arrival (TOA) real time location standard (RTLS);
   a dual mode mobile station within the wireless local area network and operative for multimode communications with both said WiFi and RTLS compliant access point stations; and
   a location processor operatively connected with each of said access point stations and operative for processing the RSSI from said first set of access point stations and creating a RSSI locate map and processing communication signals from the second set of access point stations and determining which signals are first-to-arrive signals to locate the mobile station and update the RSSI locate map to locate any non-dual mode WiFi devices.

2. The wireless local area network according to claim 1, wherein said dual mode mobile station comprises a tag transceiver.

3. The wireless local area network according to claim 1, wherein said dual mode mobile station and WiFi compliant access point stations are operative in compliance with said IEEE 802.11 standard.

4. The wireless local area network according to claim 3, wherein said dual mode mobile station and WiFi compliant access point stations are operative in a CCX mode for 802.11 tag transceivers.

5. The wireless local area network according to claim 1, wherein said location processor is operative for processing the maximum likelihood estimation for determining location probabilities and updating the RTLS locate map.

6. The wireless local area network according to claim 1, wherein said location processor is operative for correlating a signal as a first-to-arrive signal and conducting differentiation of the first-to-arrive signals to locate the dual mode mobile station.

7. The wireless local area network according to claim 1, wherein said access point stations are positioned at known locations within said wireless local area network.

8. The wireless local area network according to claim 1, wherein said dual mode mobile station is operative for transmitting spread spectrum communications signals.

9. The wireless local area network according to claim 1, wherein said location processor further comprises a matched filter correlator.

10. The wireless local area network according to claim 1, wherein said dual mode mobile station comprises a receiver operative for receiving an interrogation signal and in response, transmitting an RF communications signal to said access point stations.

11. The wireless local area network according to claim 1, wherein said receiver comprises a magnetic receiver.

12. A system for locating an object within a monitored environment, comprising:
- a dual mode tag transceiver associated with the object, said dual mode tag transceiver operative for transmitting RF communications signals;
- a plurality of receivers within the monitored environment for receiving RF communications signals from the dual mode tag transceiver, wherein a first set of said receivers comprise WiFi compliant receivers that measure signal strength and determine the received signal strength indication (RSSI) and a second set of said receivers are operable in accordance with a time of arrival (TOA) real time location standard (RTLS); and
- a location processor operatively connected with each of said receivers and operative to process the RSSI from said first set of receivers and create a RSSI locate map and process communication signals from the second set of receivers and determine which signals are first-to-arrive signals to locate the dual mode tag transceiver and associated object and update the RSSI locate map to locate any non-dual mode WiFi devices.

13. The system according to claim 12, wherein said dual mode tag transceiver and WiFi compliant receivers are operative in compliance with the IEEE 802.11 standard.

14. The system according to claim 12, wherein said dual mode tag transceiver and WiFi compliant receivers are operative in a CCX mode for 802.11 tag transceivers.

15. The system according to claim 12, wherein said location processor is operative for processing the maximum likelihood estimation for determining location probabilities and updating the RTLS locate map.

16. The system according to claim 12, wherein said location processor is operative for correlating a signal as a first-to-arrive signal and conducting differentiation of the first-to-arrive signals to locate the dual mode tag transceiver.

17. The system according to claim 12, wherein said receivers are positioned at known locations within said monitored environment.

18. The wireless local area network according to claim 12, wherein said dual mode tag transceiver comprises a receiver operative for receiving an interrogation signal and in response, transmitting an RF communications signal.

19. The wireless local area network according to claim 18, wherein said receiver comprises a magnetic receiver.

20. A method of locating a dual mode mobile station within a wireless local area network, comprising:
- transmitting wireless communications signals from a dual mode mobile station to a plurality of access point stations that comprise WiFi compliant access point stations that measure signal strength and determine the received signal strength indication (RSSI) and a second set of access point stations operable in accordance with a time of arrival (TOA) real time location standard (RTLS);
- processing the RSSI from the first set of access point base stations;
- creating a RSSI locate map;
- processing communications signals from the second set of access point stations to determine which signals are first-to-arrive signals for locating the dual mode mobile station; and
- updating the RSSI locate map to locate any non-dual mode WiFi devices.

21. The method according to claim 20, which further comprises processing a maximum likelihood estimation for determining location probabilities and updating the RTLS locate map.

22. The method according to claim 20, which further comprises correlating a signal as a first-to-arrive signal and conducting differentiation of the first-to-arrive signals to locate the dual mode mobile station.

23. The method according to claim 20, which further comprises positioning the access point stations as known locations.

24. The method according to claim 20, which further comprises transmitting an interrogation signal to the dual mode mobile station, and in response, transmitting the wireless communications signals.

* * * * *

UNITED STATES PATENT AND TRADEMARK OFFICE
CERTIFICATE OF CORRECTION

| | |
|---|---|
| PATENT NO. | : 7,899,006 B2 |
| APPLICATION NO. | : 11/949080 |
| DATED | : March 1, 2011 |
| INVENTOR(S) | : Boyd |

It is certified that error appears in the above-identified patent and that said Letters Patent is hereby corrected as shown below:

<u>Column 2,</u>

Line 38, "WELAN" should read --WLAN--.

<u>Column 20,</u>

Line 58, "RE energy" should read --RF energy--.

Signed and Sealed this
Thirteenth Day of March, 2012

David J. Kappos
*Director of the United States Patent and Trademark Office*